(12) United States Patent
Mehta et al.

(10) Patent No.: US 12,267,460 B2
(45) Date of Patent: *Apr. 1, 2025

(54) UTILIZING MACHINE LEARNING MODELS TO GENERATE INTERACTIVE DIGITAL TEXT THREADS WITH PERSONALIZED AGENT ESCALATION DIGITAL TEXT REPLY OPTIONS

(71) Applicant: Chime Financial, Inc., San Francisco, CA (US)

(72) Inventors: Jigar Mehta, Milpitas, CA (US); Abbey Chaver, Berkeley, CA (US); Paul Zeng, New York, NY (US); Abhi Sharma, San Francisco, CA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,356

(22) Filed: Mar. 18, 2024

(65) Prior Publication Data

US 2024/0364814 A1 Oct. 31, 2024

Related U.S. Application Data

(63) Continuation of application No. 18/057,886, filed on Nov. 22, 2022, now Pat. No. 11,936,814.

(51) Int. Cl.
*H04M 3/51* (2006.01)
*H04L 51/02* (2022.01)
*H04L 51/046* (2022.01)

(52) U.S. Cl.
CPC .......... *H04M 3/5191* (2013.01); *H04L 51/02* (2013.01); *H04L 51/046* (2013.01)

(58) Field of Classification Search
CPC ....... H04L 51/02; H04L 51/04; H04L 51/046; H04M 3/5191

(Continued)

(56) References Cited

U.S. PATENT DOCUMENTS 9,495,331 B2  11/2016  Govrin et al.
9,565,312 B2 *  2/2017  Conway ............... H04M 3/5232

(Continued)

OTHER PUBLICATIONS

U.S. Appl. No. 17/809,765, filed Sep. 18, 2023, Office Action.

(Continued)

*Primary Examiner* — Sargon N Nano
(74) *Attorney, Agent, or Firm* — Keller Preece PLLC

(57) ABSTRACT

The present disclosure relates to systems, non-transitory computer-readable media, and methods for utilizing machine learning models to determine predicted client intent classifications and/or client-agent escalation classes to generate personalized digital text reply options within an automated interactive digital text thread. For example, disclosed systems utilize the machine learning model to generate predicted client-agent escalation classes and corresponding probabilities. The disclosed systems utilize the predicted client-agent escalation classifications and the escalation class probabilities to generate personalized digital text reply options. Moreover, the disclosed systems can provide personalized digital text reply options to a client device within an automated interactive digital text thread, bypassing the inefficiency of menu options or protocols utilized to guide clients to terminal information.

20 Claims, 14 Drawing Sheets

(58) Field of Classification Search
USPC .......................................................... 709/206
See application file for complete search history.

(56) References Cited

U.S. PATENT DOCUMENTS

| | | | |
|---|---|---|---|
| 9,571,649 B2* | 2/2017 | Sharpe | ................ H04M 3/5191 |
| 9,813,556 B2 | 11/2017 | Sharpe et al. | |
| 9,823,811 B2 | 11/2017 | Brown et al. | |
| 9,924,033 B2 | 3/2018 | Sharpe et al. | |
| 10,142,486 B1* | 11/2018 | Reeder | ................ H04M 3/5183 |
| 10,554,590 B2* | 2/2020 | Cabrera-Cordon | .... G06N 5/022 |
| 10,554,817 B1* | 2/2020 | Sullivan | ............. H04L 41/5054 |
| 10,922,483 B1 | 2/2021 | Shevchenko et al. | |
| 10,937,034 B2 | 3/2021 | Maag et al. | |
| 11,516,157 B1 | 11/2022 | da Jornada et al. | |
| 11,783,126 B2 | 10/2023 | Galistsky | |
| 11,790,177 B1 | 10/2023 | Barrasso et al. | |
| 2015/0185996 A1 | 7/2015 | Brown et al. | |
| 2015/0341496 A1* | 11/2015 | Conway | .............. H04M 3/5183 379/265.09 |
| 2016/0359771 A1 | 12/2016 | Sridhar | |
| 2017/0098172 A1 | 4/2017 | Ellenbogen et al. | |
| 2017/0277993 A1 | 9/2017 | Beaver et al. | |
| 2018/0077088 A1 | 3/2018 | Cabrera-Cordon et al. | |
| 2019/0102701 A1 | 4/2019 | Singaraju et al. | |
| 2019/0294669 A1 | 9/2019 | Mohan | |
| 2019/0295536 A1 | 9/2019 | Sapugay et al. | |
| 2019/0377794 A1 | 12/2019 | Li et al. | |
| 2020/0380389 A1 | 12/2020 | Eldeeb et al. | |
| 2021/0004390 A1 | 1/2021 | Li et al. | |
| 2021/0073468 A1 | 3/2021 | Deshmukh et al. | |
| 2021/0089624 A1 | 3/2021 | Bealby-Wright | |
| 2021/0097110 A1 | 4/2021 | Asthana et al. | |
| 2021/0168096 A1 | 6/2021 | Miranda et al. | |
| 2021/0193124 A1 | 6/2021 | Razin et al. | |
| 2021/0209109 A1 | 7/2021 | Zhang et al. | |
| 2021/0334819 A1* | 10/2021 | Hayes | .................. G06Q 30/016 |
| 2022/0058342 A1 | 2/2022 | Fan et al. | |
| 2022/0094649 A1* | 3/2022 | Le | ........................... G06F 40/35 |
| 2022/0172021 A1 | 6/2022 | Hoang et al. | |
| 2022/0222281 A1 | 7/2022 | Eom et al. | |
| 2022/0247700 A1 | 8/2022 | Bhardwaj et al. | |
| 2022/0335222 A1 | 10/2022 | Le | |
| 2022/0382993 A1 | 12/2022 | Lewis et al. | |
| 2023/0108469 A1 | 4/2023 | Le | |
| 2023/0222291 A1 | 7/2023 | Ranganathan | |
| 2023/0261944 A1* | 8/2023 | Lemley | ............... H04L 41/0886 709/224 |

OTHER PUBLICATIONS

U.S. Appl. No. 17/809,765, filed Feb. 1, 2024, Notice of Allowance.
U.S. Appl. No. 18/057,886, filed Nov. 1, 2023, Notice of Allowance.
U.S. Appl. No. 18/738,954, Jan. 7, 2025, Notice of Allowance.

* cited by examiner

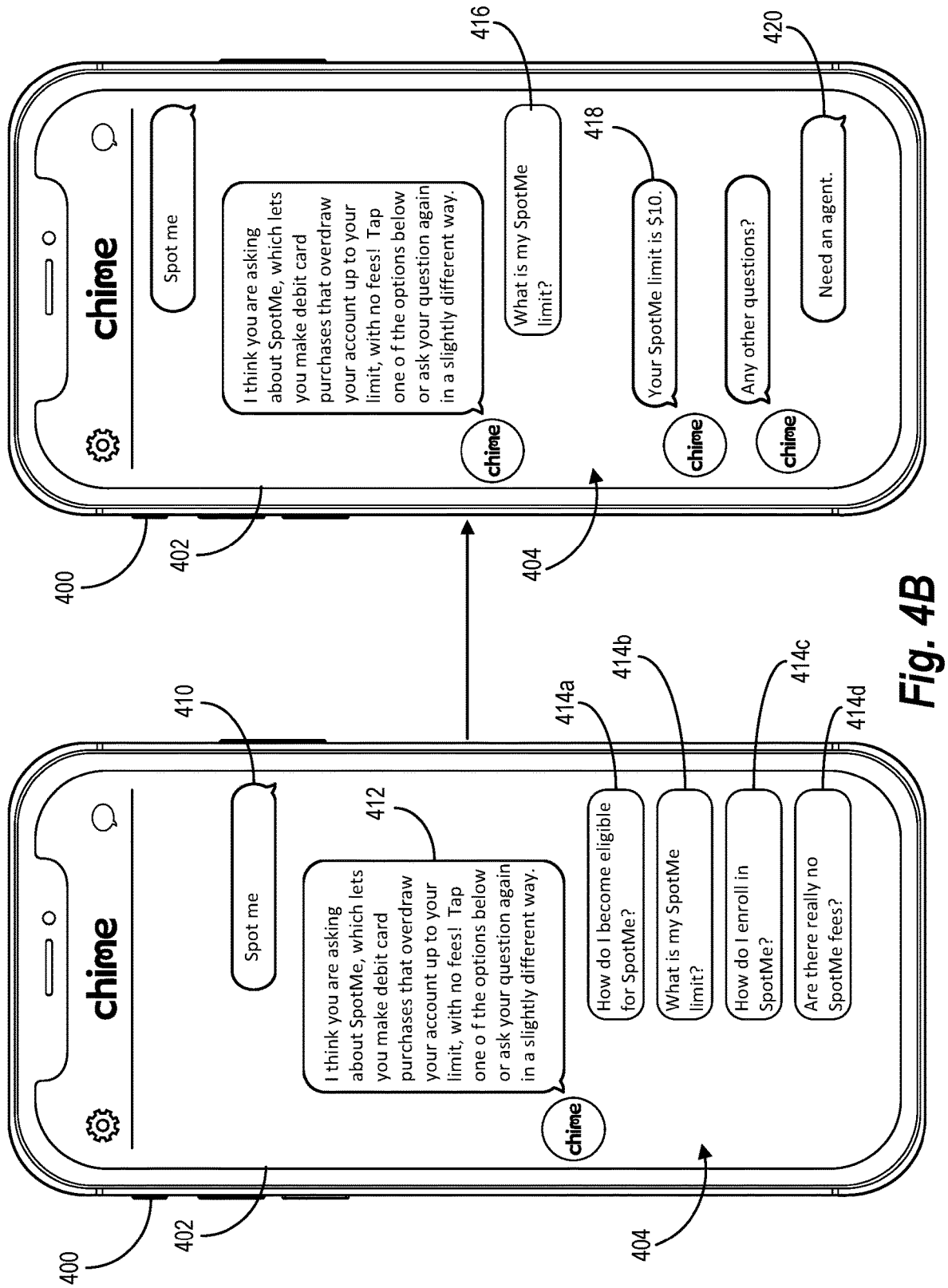

| Model | Top5 |
|---|---|
| XgBoost | 82% |
| LightGBM | 85% |
| Random Forest | 75% |

*Fig. 6B*

| Model | 3 Intents Acc |
|---|---|
| XgBoost | 77% |
| LightGBM | 82% |
| CatBoost | 70% |

*Fig. 6A*

UTILIZING MACHINE LEARNING MODELS TO GENERATE INTERACTIVE DIGITAL TEXT THREADS WITH PERSONALIZED AGENT ESCALATION DIGITAL TEXT REPLY OPTIONS

CROSS-REFERENCE TO RELATED APPLICATIONS

This application is a continuation of U.S. patent application Ser. No. 18/057,886, filed on Nov. 22, 2022. The aforementioned application is hereby incorporated by reference in its entirety.

BACKGROUND

Recent years have seen significant improvements in conventional systems for utilizing computing devices to interact with various clients and client devices. For example, conventional systems can utilize computer-implemented chat bots to guide clients through various options and identify desired information or services. Although conventional systems can autonomously interact with clients, these conventional systems have a number of problems in relation to accuracy, efficiency, and flexibility of implementing computing devices.

For instance, conventional systems are often inaccurate in guiding clients/client devices to pertinent resources. For example, based on interactions with menu options, conventional systems often route clients to an inaccurate terminal path that fails to provide the needed information or resources. Indeed, because conventional systems broadly generalize menu and sub-menu options this leads the system to route clients to information that is inapplicable and inaccurate.

In addition, conventional systems are also inefficient. For example, inaccurately routing clients increases the overall burden on implementing devices resulting from longer interaction times, additional interactions and/or interfaces, and increased routing to agent devices. Indeed, conventional systems often require excessive interaction with user interfaces, causing client devices to navigate to alternative digital resources. Specifically, an automated client interaction system that interacts with clients via a predefined text display list of menu options can require numerous user input interactions, causing client devices to initiate additional interactive sessions with alternate devices and/or escalate a query to interactions with an agent device. Such interactions place additional unnecessary burdens on computational resources of implementing devices. In conventional systems, the litany of steps required for the system to narrow down the reason for the client contact results in excessive interactions and wasted computing resources.

In addition, conventional systems are often inflexible and rigid. For example, conventional systems often utilize a rigid, predefined menu structure of options that clients must utilize in order to obtain pertinent information. Accordingly, conventional systems inflexibly present this menu of options to clients regardless of the nature or context of the interaction. This inflexibility exacerbates the accuracy and efficiency concerns discussed above. These along with additional problems and issues exist with regard to conventional automated client interaction systems.

SUMMARY

This disclosure describes one or more embodiments of methods, non-transitory computer-readable media, and systems that can solve the foregoing problems in addition to providing other benefits by utilizing machine learning models to generate personalized digital text reply options based on predicted client intent classifications and/or predicted client-agent escalation classes. For example, the disclosed systems extract client features for client devices engaged in an automated interactive digital text thread. Moreover, the disclosed systems use a machine learning model to generate predicted client intent classifications and corresponding intent classification probabilities. Further, the disclosed systems utilize the predicted client intent classifications and intent classification probabilities to select the most applicable client intent classifications and generate personalized digital text reply options. To illustrate, the disclosed systems can compare intent classification probabilities to select two or more (e.g., three or five) predicted client intent classifications and generate two or more (e.g., three or five) personalized digital text reply options that reflect selected intent classifications. Additionally, the disclosed systems can provide the personalized digital text reply options via the interactive digital text thread, bypassing options or other structures for guiding a client device to pertinent information.

In addition, in one or more implementations, the disclosed systems utilize an agent escalation machine learning model to determine predicted client-agent escalation classes. For example, the disclosed systems can train a specific agent escalation machine learning model based on historical escalations with agent devices to predict an escalation class (e.g., in addition to or in the alternative to predicting an intent classification). In some implementations, the disclosed systems surface personalized escalation digital text reply options via the interactive digital text thread that reflect the predicted client-agent escalation classes. In response to interaction with the predicted client-agent escalation classes, the disclosed systems can initiate a client self-service workflow that provides digital information (and reduces the number of escalations to agent devices from the interactive digital text thread). In this manner, the disclosed systems can generate personalized digital text reply options within automated interactive digital text threads that efficiently and flexibly guide client devices to pertinent resources.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 4A-4C illustrate an example graphical user interface displaying an automated interactive digital text thread and digital text reply options in accordance with one or more embodiments.

FIGS. 6A-6C illustrate experimental results regarding example machine learning model architectures in accordance with one or more embodiments.

DETAILED DESCRIPTION

Figure 1:
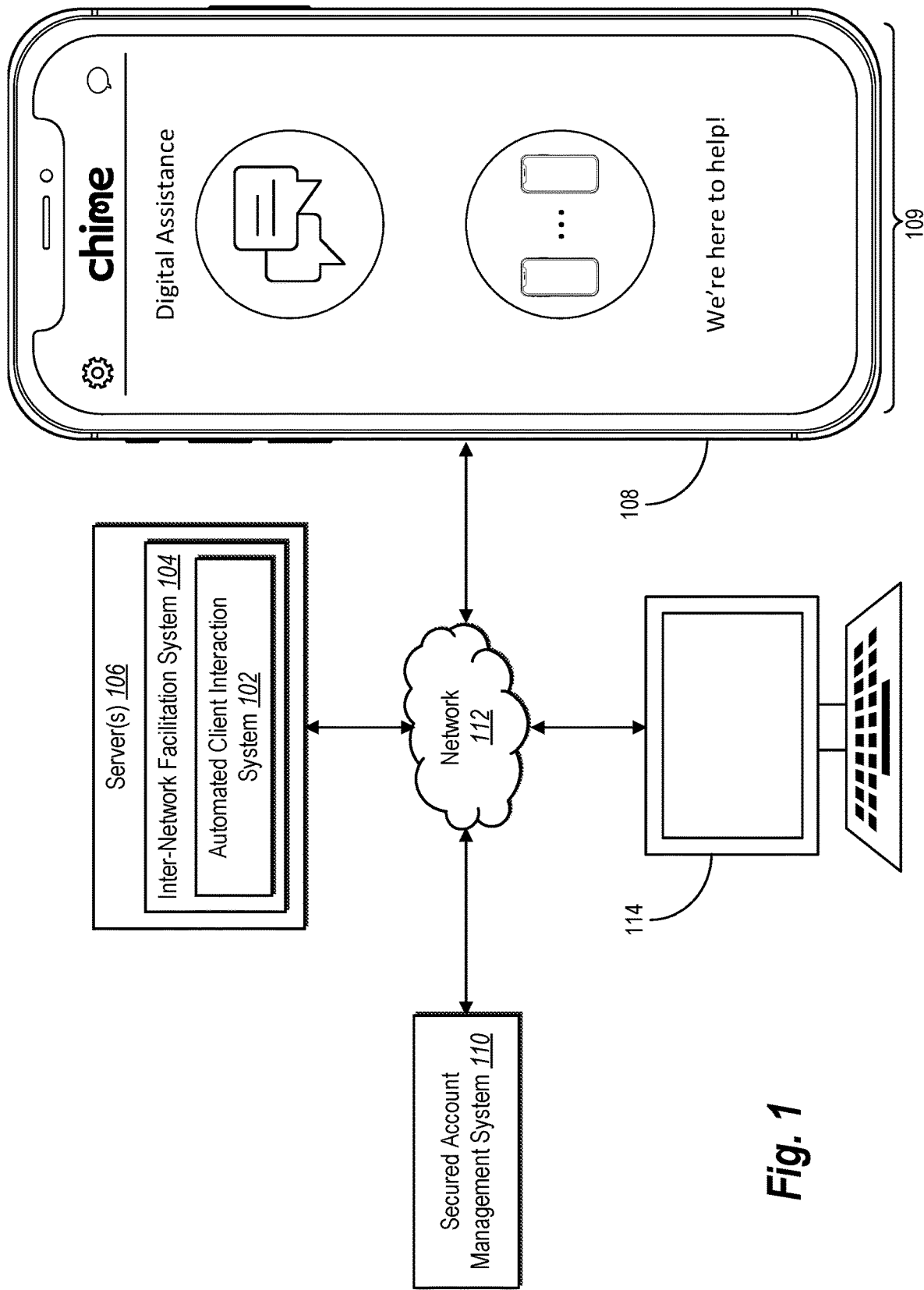
FIG. 1 illustrates a block diagram of an environment for implementing an automated client interaction system in accordance with one or more embodiments.

This disclosure describes one or more embodiments of an automated client interaction system that utilizes a trained machine learning model to predict client intent classifications and/or client-intent escalation classes and generate a plurality of personalized digital text reply options for utilization within an automated interactive digital text thread. To elaborate, the automated client interaction system can utilize a decision tree model (such as a gradient boost machine or random forest machine learning model) trained based on historical client interactions to generate personalized digital text reply options based on predicted client intent classifications. For example, the automated client interaction system can extract features from a client device and analyze those features using a machine learning model to generate predicted client intent classifications and intent classification probabilities. Furthermore, the automated client interaction system can generate selectable digital text replies for the client device using the client intent classifications and the intent classification probabilities. In one or more embodiments, the automated client interaction system monitors interactions between the client device and the automated client interaction system to compare actual client intent classifications with predicted client intent classifications and further trains the machine learning model based on this comparison. In this manner, the automated client interaction system can improve the efficiency, accuracy, and flexibility of implementing computing devices in managing automated interactive digital text threads.

As just mentioned, the automated client interaction system extracts client features corresponding to a client/client device. The automated client interaction system then utilizes these features in a machine learning model to generate predicted client intent classifications. For instance, the automated client interaction system can monitor client device interactions, determine client device characteristics, and access digital accounts corresponding to the client device to extract features. To illustrate, in response to initiating an automated interactive digital text thread with a client device, the automated client interaction system can determine a client's recent activity or previous client intent classifications from earlier interactive sessions.

Upon determining client features, the automated client interaction system utilizes a machine learning model to generate predicted client intent classifications. For example, in one or more implementations the automated client interaction system utilizes, a random forest model, or a gradient boosted decision tree (such as LightGBM) to generate predicted client intent classifications (e.g., classifications corresponding to a particular intent or purpose of the client interaction). To illustrate, the automated client interaction system utilizes a trained random forest model to analyze the extracted client features from the client interaction to generate predicted client intent classifications and intent classification probabilities. For instance, the machine learning model can predict that the client seeks pertinent information regarding a direct deposit status and that the prediction has a 75% probability of holding true. Moreover, the machine learning model can predict that the client seeks pertinent information regarding eligibility for a base limit value extension for a digital account and that the prediction has a 15% probability of holding true.

As mentioned above, the automated client interaction system can utilize intent classification probabilities in tandem with predicted client intent classifications to generate personalized digital text reply options. For example, the automated client interaction system can compare the intent classification probabilities to generate a ranking of predicted client intent classifications. In some embodiments, the automated client interaction classification system can also compare the intent classification probabilities with an intent classification threshold. Based on the ranking (and/or upon determining that the intent classification threshold is satisfied), the automated client interaction system can generate personalized digital text reply options that reference the predicted client intent classifications. Moreover, the automated client interaction system can provide the personalized digital text reply options for display within an automated interactive digital text thread.

In one or more implementations, the automated client interaction system determines client interaction classifications from a hierarchical intent architecture. Indeed, the automated client interaction system can maintain a plurality of client intent classifications in various layers. For instance, the automated client interaction system can organize broad classifications on a first layer, more narrow classifications on a second layer, and even more specific classifications on a third layer. In one or more implementations, the automated client interaction system generates client intent classifications by selecting client intent classifications from different layers of this hierarchical intent architecture. To illustrate, the automated client interaction system can generate a first client intent classification from a second layer of the hierarchical intent architecture and a second client intent classification from a first layer of the hierarchical intent architecture. Accordingly, the automated client interaction system can dynamically generate client intent classifications at different levels of specificity (e.g., depending on the confidence of predictions at different layers and the amount of training data corresponding to different layers).

Furthermore, the automated client interaction system can iteratively interact with the client device via the automated interactive digital text thread. For example, in response to user interaction with a personalized digital text reply option, the automated client interaction system generates a digital text response corresponding to the personalized digital text reply option and adds the digital text response to the automated interactive digital text thread. In addition, the automated client interaction system can also provide an additional set of digital text reply options to the client device (e.g., to further guide the client device to pertinent information).

As mentioned above, the automated client interaction system can train the machine learning model. In some embodiments, the automated client interaction system trains the machine learning model to utilize extracted client features and monitored client intent classifications as ground truths for supervised training. In some implementations, the automated client interaction system utilizes predicted client intent classifications for a client device and monitored interactions to further train the machine learning model. Indeed, by monitoring client interactions, after predicted client intent classifications, the automated client interaction system can determine actual client intent classifications. The automated client interaction system can compare a ground truth client intent classification with predicted client intent classifications and further train and improve the machine learning model.

In one or more implementations, the automated client interaction system utilizes an agent escalation machine learning model to generate client-agent escalation classes. For example, the automated client interaction system trains an agent escalation machine learning model specifically based on historical ground truth escalation classes to learn escalation reasons from historical interactions with interactive digital text threads. The automated client interaction system can utilize the trained agent escalation machine learning model to generate client-agent escalation classes and corresponding escalation class probabilities. Utilizing the client-agent escalation classes and escalation class probabilities, the automated client interaction system can surface personalized a set of escalation digital text reply options (e.g., 3 or 5 options) specifically targeted to potential escalation reasons corresponding to a client device.

These escalation digital text reply options can include escalation classes from a particular escalation hierarchical architecture. For instance, the automated client interaction system can train the agent escalation machine learning model from a separate escalation hierarchical architecture at a more specific or granular level of detail from escalation tickets. Thus, in some implementations, the automated client interaction system can surface escalation digital text reply options specifically targeted to address and resolve client-agent escalations through self-service workflows (rather than focused on agent intent to encourage interaction with text reply options). Indeed, the automated client interaction system can detect user interaction with an escalation digital text reply option and initiate a self-service workflow to reduce escalations to agent devices.

In some embodiments, the automated client interaction system initially provides personalized intent digital text reply options (utilizing an intent machine learning model) and then, in response to selection of an escalation option, generates personalized escalation digital text reply options (utilizing an agent escalation machine learning model). This approach can assist in providing initial digital text reply options that encourage client engagement and then focusing digital text reply options on escalation classes and self-service workflows to reduce client-agent escalations. In some embodiments, the automated client interaction system provides personalized escalation digital text reply options utilizing an agent escalation machine learning model immediately (i.e., without first providing other personalized digital text reply options utilizing other machine learning models).

As suggested above, the disclosed automated client interaction system provides several improvements or advantages over conventional systems. For example, the automated client interaction system can improve the inaccuracy of conventional systems by predicting client intent classifications and generating personalized digital text reply options. For example, by utilizing a trained intent machine learning model and extracted features corresponding to a client device, the automated client interaction system can predict an accurate client intent and implement an automated interactive digital text thread without relying solely on predefined menu options. Similarly, the automated client interaction system can predict accurate escalation classes and provided escalation digital text reply options. Accordingly, the automated client interaction system can utilize implementing computer devices to determine and provide accurate data to client devices.

In addition, the automated client interaction system can improve inefficiencies of conventional systems by reducing the overall burden on implementing devices. For example, the automated client interaction system can utilize a trained machine learning model to generate predicted client intent classifications and generate personalized digital text reply options. Similarly, the automated client interaction system can utilize a trained escalation machine learning model to generate predicted client-agent intent classifications and generate personalized escalation digital text reply options. Accordingly, the automated client interaction system can reduce interaction times, user interfaces, and computing resources in interacting with client devices. Indeed, by reducing the number of user inputs, interfaces and interaction times, the automated client system can reduce unnecessary burdens on computing resources. Moreover, the automated client interaction system can reduce the number of client devices that escalate to utilize computing resources of agent devices or navigate to alternate resources upon initiating an automated interactive digital text thread. In short, the automated client interaction system can decrease resolution/analysis time, decrease device escalation rate, and decrease device abandonment rate.

The automated client interaction system can also improve the inflexibility and rigidity of conventional systems. For example, the automated client interaction system can generate predicted client intent classifications and provide personalized digital text reply options that reflect the particular context of a client query. Moreover, the automated client interaction system can generate predicted escalation classes and provided personalized escalation text reply options that reflect most likely reasons to escalate an automated interactive digital text thread to an agent device. In doing so, the automated client interaction system can flexibly bypass rigid menus or operational structures that plague conventional systems. Indeed, the automated client interaction system can flexibly generate pertinent automated interaction responses and initiate workflows flexibly route client devices specific resources. Indeed, as discussed above, the automated client interaction system can determine class intent classifications and client-agent escalation classes, generate selectable digital reply options from different levels of various hierarchical structures, and generative interactive self-service workflows that allow the client device to dynamically bypass rigid options associated with conventional systems.

As indicated by the foregoing discussion, the present disclosure utilizes a variety of terms to describe features and advantages of the automated client interaction system. For example, as used herein, the term "predicted client intent classification" refers to a class or category indicating a purpose, disposition, intent, reason, or objective for a client interaction. In particular, a predicted client intent classification can include a probable intention of the client, determined by a machine learning model trained on past interaction and informed by client features. To illustrate, a predicted client intent classification can include a prediction that a client device is interacting with the automated client interaction system to inquire about a direct deposit status, interaction history, and/or device fee information.

In addition, the term "predicted client-agent escalation class" refers to a classification or category for escalating an initial client interaction to an agent device. In particular, a predicted client-agent escalation class can include a probable reason that a client device will escalate a query or concern to an agent device, as determined by a machine learning model trained on past escalation reasons and client features.

As mentioned above, the automated client interaction system can implement an automated interactive digital text thread with one or more client devices. As used herein, the term "automated interactive digital text thread" refers to a series of digital messages between a client device and a computer-implemented text generation model. In particular, an automated interactive digital text thread can include an instant message thread, text message thread, SMS message thread, or MMS message thread between a client device and automated text generation model (e.g., a chat bot).

An automated interactive digital text thread can include sender messages, recipient messages, and other interface elements. For example, in some embodiments, the automated client interaction system generates personalized digital text reply options and includes the personalized digital text reply options within an interactive digital text thread. In one or more implementations, the digital text reply options are included as options within the interactive digital text thread visible to a client device, but are not added to the list of communications (e.g., the thread of messages) available to both the sender and recipient. Upon selection of a personalized digital text reply option, the automated client interaction system can generate a digital text response and include the digital text response in the interactive digital text thread (e.g., illustrate the digital text response to both the sender and recipient as part of the thread of messages).

As discussed, the automated client interaction system can extract client features for use by the machine learning model. As used herein, the term "client features" refers to attributes, characteristics, behaviors, and/or interactions corresponding to a client/client device. In particular, the term "client features" can include previous interactions, client balance, digital account status, and recent activity. To illustrate, client features can include that the client has opened an account for a total of two months, that the client has initiated contact with the automated client interaction system five times in the past week, or that the client had recently received a communication regarding security issues with an account.

In one or more embodiments, the automated client interaction system uses a machine learning model. As used herein, the term "machine learning model" refers to a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, linear regressions, logistic regressions, random forest models, or neural networks (e.g., deep neural networks).

In addition, the automated client interaction system can use a machine learning model to generate an intent classification probability. As used herein, the term intent classification probability refers to a likelihood of a particular client intent classification. In particular, the term intent classification probability can include a probability that a client is interacting with the automated client interaction system for a predicted client intent classification. To illustrate, an intent classification probability can include a 65% probability that a client is initiating an interactive digital text thread to inquire about a direct deposit status.

In some embodiments, the automated client interaction system uses an escalation machine learning model (i.e., an "agent escalation machine learning model"). An escalation machine learning model refers specifically to a machine learning model trained to generate client-agent escalation classes.

The automated client interaction system can also initiate a client-agent response session. As used herein, the term "client-agent response session" refers to an interaction between a client and agent. In particular, the term "client-agent response session" can include a client device interacting with an agent device through text or an oral response.

As discussed, the automated client interaction system can further train the machine learning model with a ground truth client intent. As used herein, the term "ground truth client intent" refers to a known observation or result. In particular, a ground truth client intent can include a known intent or disposition of a client. To illustrate, a ground truth client intent can include a known purpose or intent for a previous interaction from the client.

Moreover, the automated client interaction system can also train an escalation machine learning model utilizing a ground truth client-agent escalation class. The term "ground truth client-agent escalation class" refers to a known or observed reason for an escalation to an agent device. Thus, a ground truth client-agent escalation class can include a labeled ticket from an agent device upon escalation of an automated interactive digital text thread to the agent device.

Additional detail regarding the automated client interaction system will now be provided with reference to the figures. In particular, FIG. 1 illustrates a block diagram of a system environment for implementing an automated client interaction system 102 in accordance with one or more embodiments. As shown in FIG. 1, the environment includes server(s) 106 implementing the automated client interaction system 102 as part of an inter-network facilitation system 104. The environment of FIG. 1 further includes a client device 108, a device application 109, an agent device 114, and a secured account management system 110. The server (s) 106 can include one or more computing devices to implement the automated client interaction system 102. Additional description regarding the illustrated computing devices (e.g., the server(s) 106, the client device 108, the agent device 114 and/or the secured account management system 110) is provided with respect to FIGS. 8-9 below.

As shown, the automated client interaction system 102 utilizes the network 112 to communicate with the client device 108, the agent device 114, and/or the secured account management system 110. The network 112 may comprise a network as described in relation to FIGS. 8-9. For example, the automated client interaction system 102 communicates with the client device 108 to provide and receive information pertaining to various client interactions. Indeed, the inter-network facilitation system 104 or the automated client interaction system 102 can provide an automated interaction response to the client device 108 or can facilitate a session between the agent device 114 and the client device 108.

As described in greater detail below (e.g., in relation to FIG. 9), the inter-network facilitation system 104 can manage interactions across multiple devices, providers, and computer systems. For example, the inter-network facilitation system 104 can execute transactions across various third-party systems such as a banking entities, automated transaction machines, or payment providers. The inter-network facilitation system 104 can also maintain and manage digital accounts for client devices/users to store, manage, and/or transfer funds to other users.

To facilitate automated interaction responses, in some embodiments, the inter-network facilitation system 104 or the automated client interaction system 102 communicates with the secured account management system 110. More specifically, the inter-network facilitation system 104 or the automated client interaction system 102 determines the identity and permissions of the client device 108 by communicating with the secured account management system 110. The automated client interaction system 102 can determine permissions of the client device 108 prior to disclosing secure information to the client device 108. For example, the inter-network facilitation system 104 or the automated client interaction system 102 accesses a secured account maintained by the secured account management system 110 (e.g., remotely from the server(s) 106) and determines the last direct deposit within the secured account.

In one or more embodiments, the inter-network facilitation system 104 or the automated client interaction system 102 communicates with the secured account management system 110 in response to the automated client interaction system 102 receiving identification information from the client device 108. In particular, the inter-network facilitation system 104 or the automated client interaction system 102 provides an indication of a secured account associated with a digital account to indicate that the client device 108 is authorized to receive information pertaining to the digital account. In addition, the inter-network facilitation system 104 or the automated client interaction system 102 communicates with the secured account management system 110 to determine permissions of the client device 108. For example, the inter-network facilitation system 104 or the automated client interaction system 102 provides information to the client device 108 such as direct deposit status, digital account updates, device fee information, check status, interaction history, order status, activation, etc.

As indicated by FIG. 1, the client device 108 includes the device application 109. In particular, the device application 109 can include a web application, a native application installed on the client devices 108 (e.g., a mobile application, a desktop application, etc.), or a cloud-based application where all or part of the functionality is performed by the server(s) 106. In some embodiments, the inter-network facilitation system 104 or the automated client interaction system 102 communicates with the client device 108 through the device application 109. This communication for example, receives and provides information including direct deposit status, digital account updates, device fee information, check status, interaction history, order status, activation, etc. As shown, the automated client interaction system 102 can provide digital account information and secured account information for display within a graphical user interface associated with the device application 109 or can provide digital account information via other methods such as a voice protocol response. An interactive voice response can occur between the client device 108 and the inter-network facilitation system 104 or the automated client interaction system 102. On the other hand, the inter-network facilitation system 104 or the automated client interaction system 102 can provide a graphical user interface that includes digital account information pertaining to the client device 108.

As shown in FIG. 1, the client device 108 implements the device application 109 in conjunction with interaction with the inter-network facilitation system 104 or the automated client interaction system 102. For example, the inter-network facilitation system 104 or the automated client interaction system 102 can monitor the activities of the device application 109. In particular, these activities can include events such as time spent on device application 109, recently viewed pages on device application 109, the most recent activation activity of the device application 109, etc.

To illustrate, in one or more embodiments, the automated client interaction system 102 detects the client device 108 requesting an interactive digital text communication. The automated client interaction system 102 generates and provides, for display, an automated interactive digital text thread via the client device 108. The client device 108 can enter text queries or responses and the automated client interaction system 102 can generate text responses or digital text reply options. For example, the automated client interaction system 102 can generate personalized digital text reply options that allow the client to select a particular intent for initiating the automated interactive digital text thread. Similarly, the automated client interaction system 102 can generate and provide personalized escalation digital text reply options that allow the client to select a particular escalation class. Based on interaction with these personalized digital text reply options, the automated client interaction system 102 can initiate self-service workflows to provide pertinent information to the client device 108.

Although FIG. 1 illustrates the environment having a particular number and arrangement of components associated with the automated client interaction system 102, in some embodiments, the environment may include more or fewer components with varying configurations. For example, in some embodiments, the inter-network facilitation system 104 or the automated client interaction system 102 can communicate directly with the client device 108, device application 109, and/or the secured account management system 110, bypassing the network 112. In these or other embodiments, the inter-network facilitation system 104 or the automated client interaction system 102 can be implemented (entirely on in part) on the client device 108. Additionally, the inter-network facilitation system 104 or the automated client interaction system 102 can include or communicate with a database for storing information, such as direct deposit status, digital account updates, device fee information, check status, interaction history, order status, activation, and/or other information described herein.

Figure 2:
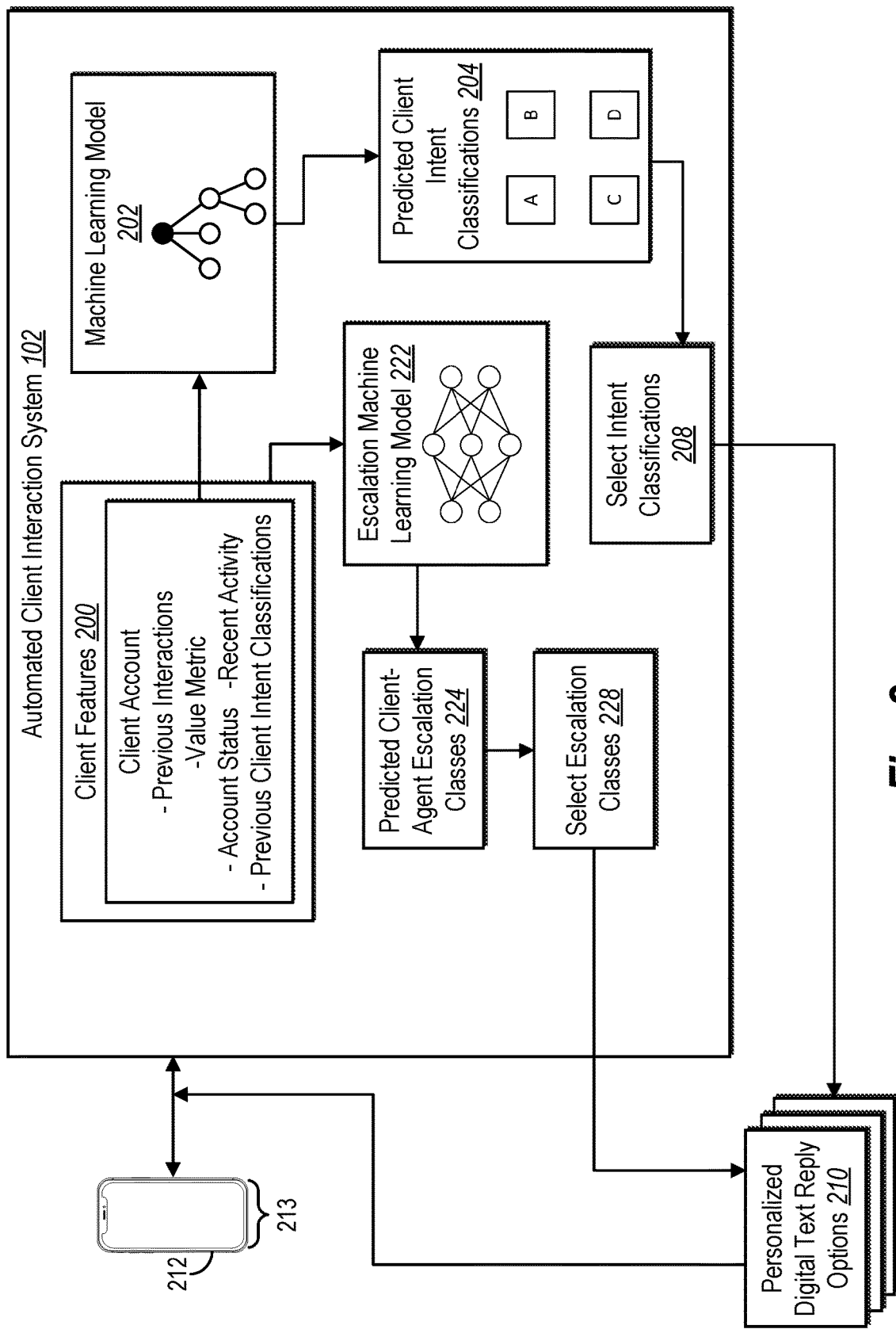
FIG. 2 illustrates an example diagram of an automated client interaction system that utilizes a machine learning model and/or an agent escalation machine learning model to generate personalized digital text reply options in accordance with one or more embodiments.

As discussed above, the automated client interaction system 102 can interact with the client device 108 to provide selectable digital text replies using one or more machine learning models. For example, FIG. 2 illustrates an overview of the automated client interaction system 102 utilizing a machine learning model 202 and an escalation machine learning model 222 to generate personalized digital text reply options 210 in accordance with one or more embodiments. More specifically, as illustrated in FIG. 2, the automated client interaction system 102 extracts client features 200 corresponding to a client device 212 and uses the machine learning model 202 to generate predicted client intent classifications 204 and intent classification probabilities. Similarly, the automated client interaction system 102 uses the escalation machine learning model 222 to generate predicted client-agent escalation classes 224 and escalation class probabilities. The automated client interaction system 102 utilizes the predicted client intent classifications 204 (with the intent classification probabilities) and the predicted client-agent escalation classes 224 (with the escalation class probabilities) to generate and provide the personalized digital text reply options 210.

As just mentioned, the automated client interaction system 102 extracts client features 200. For example, when the client device 212 contacts the automated client interaction system 102 (e.g., initiates an automated interactive digital text thread), the automated client interaction system 102 determines the identity of the client device 212 either through a device application 213 or through client provided credentials. In particular, client provided credentials can include social security numbers, caller ID, card numbers, personal identification numbers, and other information related to a digital account.

Upon determining a digital account or identity corresponding to the client device 212, the automated client interaction system 102 extracts the client features 200 corresponding to a digital account of the client device 212 or the device application 213. For example, the client features 200 can include previous interactions between the client device 212 and the automated client interaction system 102, a value metric of the digital account, an account status, enrollment activity/status, or recent activity of the digital account. For example, the client features 200 can include the last balance, transaction activity, prior or recent direct deposit activity, a maximum/minimum balance (within a threshold time), a maximum/minimum transaction amount (within a threshold time), a number of previous interactions, time since the last dispute update (e.g., a status update corresponding to a dispute), mobile check deposit activity, a fraud or risk score, and/or a number of previous interactions. The client features 200 can include interactive digital text threads (e.g., prior chatbot contacts and intents), calls (e.g., prior dispositions of calls with an interactive voice response system or agent), transactions, card orders and activations, disputes, messages (e.g., customer service topics), account views, log ins, low balance events, authorizations, web contacts, account settings views, settlements, card activity, account creations, or home page views.

The automated client interaction system 102 can extract the client features 200 from a variety of sources, including a digital account corresponding to a user, the client device 212, and/or a database of historical interactions or information pertinent to a user/client device. For instance, automated client interaction system 102 can extract the client features 200 from previous interactions with the client device 212 such as phone calls, online-chat sessions on the client device 212 or the client application 213, or user interactions with user interfaces of the device application 213.

Similarly, the automated client interaction system 102 can extract the client features 200 from a value metric such as an account balance for a digital account, the value of a direct deposit, the value of a transaction made on the digital account, the value of interest accrued on a digital account, or the value of fees owed. Moreover, the automated client interaction system 102 can extract the client features 200 from an account status such as whether an account is active, closed, temporarily disabled, on hold, or in default. Furthermore, the automated client interaction system 102 can extract the client features 200 from recent activity such as the client device 212 contacting the automated client interaction system 102 or entering an online-chat session (interactive digital text thread) within the last 5 hours. In addition, the client features 200 can include information regarding the client device, such as device type (e.g., smartphone or personal computer), operating system, or application version. Moreover, the client features 200 can include user attributes (e.g., age, income, location, etc.).

In some implementations, the automated client interaction system 102 extracts client features corresponding to base limit value of an account (e.g., a "SpotMe" amount). In particular, the automated client interaction system can utilize a base limit value, an amount of base limit value utilized, a number of base limit increases transmitted to or from a user account, as described by GENERATING USER INTERFACES COMPRISING DYNAMIC BASE LIMIT VALUE USER INTERFACE ELEMENTS DETERMINED FROM A BASE LIMIT VALUE MODEL, U.S. application Ser. No. 17/519,129, filed Nov. 4, 2021 and DETERMINING BASE LIMIT VALUES FOR CONTACTS BASED ON INTER-NETWORK USER INTERACTIONS, U.S. application Ser. No. 17/656,816, filed Mar. 28, 2022, which are expressly incorporated by reference herein in their entirety. The automated client interaction system 102 can also utilize activity or usage of other features or services of the inter-network facilitation system 104 (e.g., an account for transferring assets or paying friends or a credit card backed by a secured account).

In one or more embodiments, the automated client interaction system 102 extracts the client features 200 by comparing historical events/features with current features. For example, the client features 200 can include the time that has passed since a previous event (e.g., time since a previous call, a previous transaction, a previous dispute, a previous message, a previous viewing of an account, a previous log in, a low balance event, a previous authorization, a previous web contact, a previous viewing of account settings, a previous settlement, a card was frozen/unfrozen, an account was created, or a home page was viewed). The automated client interaction system 102 can also extract other client features such as a transaction amount (over the last threshold period, such as 128 days), a number of views (e.g., a number of home views or spending account views within the last 128 days), or a range over mean balance within a threshold time period. In some implementations, the automated client interaction system 102 extracts time since the latest recurrent direct deposit, time since the last transaction product events, time since the last application screen view, time since the latest card order, etc.

As illustrated in FIG. 2, upon extracting client features 200, the automated client interaction system 102 utilizes the machine learning model 202 to generate predicted client intent classifications and intent classification probabilities. In particular, the automated client interaction system 102 utilizes the machine learning model 202 to analyze the client features 200. For example, the automated client interaction system 102 can encode the client features 200 (e.g., using one hot encoding, an encoding layer, or a vector mapping) and then process the encoding utilizing the machine learning model 202.

The automated client interaction system 102 can utilize a variety of machine learning models to analyze the client features 200. With regard to FIG. 2, the machine learning model 202 is a decision tree, such as a random forest model or a boosted gradient decision tree. For instance, in some implementations, the automated client interaction system utilizes XGBoost, CatBoost, or LightGBM machine learning model architectures. Accordingly, the automated client interaction system 102 feeds the client features 200 to input channels of the machine learning model. The machine learning model then utilizes learned nodes within one or more decision trees to generate a predicted classification and corresponding probability or likelihood. In other implementations the automated client interaction system 102 can utilize a neural network, such as a convolutional neural network, or other machine learning model to process the client features 200.

As shown in FIG. 2, the automated client interaction system 102 utilizes the machine learning model 202 to generate the predicted client intent classifications 204. The predicted client intent classifications 204 can include a variety of dispositions or purposes for a client interaction. For example, the automated client interaction system 102 utilizes the machine learning model 202 to predict a client device initiating an automated interactive digital text threads to check on status of a dispute, become eligible for a base limit value (e.g., SpotMe), become eligible for credit builder (e.g., a credit card with a linked, secured cash account for building credit), set up direct deposit, check status of a direct deposit, deposit money into an account, initiate or check on a mobile check deposit, initiate a dispute (e.g., regarding a charge or fee), lost card, activate a card, request information regarding a recent deposit, inquire regarding a recent statement, open a new account, close an account, or some other intent. Similarly, client intent classifications can include an account update, referral bonus query, transfer status, atm location query, direct deposit status (e.g., has an account received a direct deposit), fee information (e.g., information regarding one or more fees associated with the account), check status (e.g., whether or not a check has cleared an account), interaction history (e.g., information regarding recent transactions or other interactions), order status (e.g., status of a particular order or transaction), and activation (e.g., activation of an account, product, card, or service).

To illustrate, the automated client interaction system 102 can determine "fee information" (e.g., ATM fees) as one of the predicted client intent classifications 204 upon detecting features indicating that a fee recently applied to an account. Similarly, the automated client interaction system 102 can determine "check status" (e.g., check cancellation or check clearance) in response to detecting features indicating that a client recently submitted a check for deposit, has a check scheduled for payment, or has recently called regarding the status of a check. Similarly, the automated client interaction system 102 can identify "interaction history" as one of the predicted client intent classifications 204 upon determining client features showing that the digital account associated with the client device 212 recently made multiple high value transactions, recently had a declined transaction, or recently checked their interaction history on the device application 213. In addition, the automated client interaction system 102 can identify "order status" as one of the predicted client intent classifications 204 upon identifying client features showing that the digital account associated with the client device 108 recently ordered a card associated with a digital account. Further, the automated client interaction system 102 can select the category "activation" upon determined client features indicating the digital account associated with the client device 212 recently attempted to activate a digital account or card. Moreover, the automated client interaction system 102 can determines "dispute" as one of the predicted client intent classifications 204 in response client features indicating the client device 212 recently made a large purchase that does not fit a usual pattern of spending.

In addition to the predicted client intent classifications 204, the machine learning model 202 also generates the intent classification probabilities. The intent classification probabilities reflect likelihoods that the predicted client intent classifications 204 correspond to the actual intent of the client. Thus, if the automated client interaction system 102 predicts "direct deposit status" as the client device's intent, the automated client interaction system also generates a corresponding probability (e.g., 45%) as a level of confidence for the actual reason of contact.

In one or more embodiments, the automated client interaction system 102 generates a plurality of predicted client intent classifications and corresponding intent classification probabilities. For example, the automated client interaction system 102 utilizes the machine learning model 202 to generate multiple predicted client intent classifications with a corresponding probability distribution for the predicted classifications.

As shown, the automated client interaction system 102 also performs an act 208 of selecting intent classifications. In particular, the automated client interaction system 102 selects a subset of client intent classifications from the predicted client intent classifications 204.

In one or more embodiments, the automated client interaction system 102 performs the act 208 utilizing an intent classification threshold. To illustrate, the automated client interaction system 102 can determine an intent classification threshold of 20%. The automated client interaction system 102 can then compare intent classification probabilities with the intent classification threshold. Thus, if the automated client interaction system 102 determines that one or more of the intent classification probabilities satisfy the intent classification threshold (e.g., 20%) the automated client interaction system 102 can take a first course of action (e.g., include the client intent classifications within a set of selected client intent classifications utilized to generate digital text reply options). If the automated client interaction system 102 determines that one or more of the intent classification probabilities (e.g., 5%) does not satisfy the intent classification threshold (e.g., 20%) the automated client interaction system 102 can take a second course of action (e.g., withhold the client intent classification). In some implementations, if no intent classification probabilities satisfy the intent classification threshold, the automated client interaction system utilizes a set of predefined digital text reply options (e.g., an agent contact selection option).

The automated client interaction system 102 can determine the intent classification threshold in a variety of ways. For example, in some implementations the automated client interaction system 102 determines the intent classification threshold based on user input (e.g., a user interaction selecting a particular threshold). In other embodiments, the automated client interaction system 102 determines the intent classification threshold based on historical user interactions with automated interaction responses. For example, the automated client interaction system 102 can determine an amount of time or computer resources to interact with automated interaction responses that are accurate and/or inaccurate. The automated client interaction system 102 can then determine the intent classification threshold to improve (e.g., optimize) the time and/or computer resources for responding to client devices.

In some embodiments, the automated client interaction system 102 compares the intent classification probabilities to select a set of predicted client intent classifications. For example, in one or more implementations, the automated client interaction system 102 ranks the predicted client intent classifications 204 based on the intent classification probabilities. Moreover, in one or more implementations, the automated client interaction system 102 takes the top number (e.g., top 2, 3, or 4) or top percentage (e.g., top 10 or 20 percent) of predicted client intent classifications 204 based on the intent classification probabilities.

As illustrated, the automated client interaction system 102 also utilizes an escalation machine learning model 222 to generate predicted client-agent escalation classes 224 from the client features 200. In one or more embodiments, the automated client interaction system 102 utilizes a separately trained machine learning model for the escalation machine learning model 222 (e.g., separate from the machine learning model 202). For example, the automated client interaction system 102 can utilize a decision tree, such as a random forest model or a boosted gradient decision tree. For instance, in some implementations, the automated client interaction system utilizes XGBoost, CatBoost, or LightGBM machine learning model architectures. The automated client interaction system 102 can utilize a variety of machine learning models as described herein, such as a trained neural network. Additional detail regarding training the escalation machine learning model 222 is provided below, e.g., in relation to FIG. 5B.

The automated client interaction system 102 utilizes the escalation machine learning model 222 to generate the predicted client-agent escalation classes 224 (and corresponding escalation class probabilities). In some implementations, the automated client interaction system 102 generates predicted client-agent escalation classes 224 from a hierarchy of escalation classes (e.g., a different hierarchy with different classes than for the client intent classifications 204). Thus, the automated client interaction system 102 generates predicted client-agent escalation classes 224 different than the predicted client intent classifications 204. For example, the automated client interaction system 102 can generate client-agent escalation classes 224 including: a new dispute, direct deposit status, replace card, dispute status, card declined, refund, transfer, credit builder, close account, check deposit rejected, check deposit status, SpotMe eligibility, update account, SpotMe boost, problems with card, referral, activate card, cash/ATMs, set up direct deposit, statements, balance, pay anyone, or tax. Additional detail regarding classification hierarchies for different machine learning models is provided below (e.g., in relation to FIGS. 3A-3B).

Similar to the machine learning model 202, the automated client interaction system 102 can generate escalation class probabilities utilizing the escalation machine learning model 222. Moreover, the automated client interaction system 102 utilize the escalation class probabilities to perform an act 228 (similar to the act 208) of selecting escalation classes. For example, the automated client interaction system 102 can determine and apply a threshold escalation class probability. In particular, the automated client interaction system 102 can compare the threshold escalation class probability to the escalation class probabilities to select a subset of escalation classes.

As illustrated in FIG. 2, the automated client interaction system 102 also generates and provides personalized digital text reply options 210 (e.g., 2, 3, 4, 5, or 10 options). For example, the automated client interaction system 102 generates the digital text reply options 210 based on the predicted client intent classifications 204 (and the intent classification probabilities) and the predicted client-agent escalation classes 224 (and the escalation class probabilities). In particular, in some embodiments the automated client interaction system 102 generates the digital text reply options 210 to include an indicator of selected intent classifications or selected escalation classes. In some embodiments, the automated client interaction system 102 determines a mapping between intent classifications/escalation classes and digital text reply options. For example, upon determining an intent classification for mobile check deposit, the automated client interaction system 102 can identify a digital text reply option that states, "I have a question about a mobile check deposit."

As shown, the automated client interaction system 102 provides the digital text reply options 210 to the client device 212. In particular, the automated client interaction system 102 provides the personalized digital text reply options 210 as user interface elements for display via the client device 212. The automated client interaction system 102 can identify a user interaction with a personalized digital text reply options from the personalized digital text reply options 210, generate a text response, and provide the text response for display via an automated digital text thread.

In some embodiments, the automated client interaction system 102 provides escalation digital text reply options for the personalized digital text reply options 210. For example, rather than providing options from the intent classifications generated by the machine learning model 202, the automated client interaction system 102 provides options from escalation classes generated by the escalation machine learning model 222. In some implementations, the automated client interaction system 102 first provides options from intent classifications generated by the machine learning model 202 and then (e.g., after user interaction with an escalation option) provides an additional set of options from escalation classes generated by the escalation machine learning model 222. Thus, the automated client interaction system 102 can provide 3 or 5 options corresponding to intent classifications and then (upon selection of an escalation option) provide 3 or 5 options corresponding to escalation classifications. Additional detail regarding user interfaces illustrating digital text reply options, digital text responses, and automated interactive digital text threads is provided below (e.g., in relation to FIGS. 4A-4B).

In some implementations, the automated client interaction system 102 provides the personalized digital text reply options 210 from both intent classifications (from the machine learning model 202) and escalation classes (selected from the escalation machine learning model 222). For example, the automated client interaction system 102 can generate options with the highest probabilities (e.g., based on both the intent classification probabilities and the extent class probabilities). Thus, regardless of source, in some embodiments, the automated client interaction system 102 selects intent classifications and escalation classes (e.g., having the highest probabilities or having probabilities that satisfy a threshold).

Although not illustrated, in some circumstances, the automated client interaction system 102 initiates a client-agent response session. For example, in some implementations, the client-agent response session includes providing an indicator of the selected client intent classifications and/or selected client-agent escalation classes via an agent device. In particular, the automated client interaction system 102 initiates an audio conversation (e.g., telephone or digital audio conversation) or a live chat session between the agent device and the client device. Accordingly, the agent device can directly assist the client device in identifying pertinent information or resources.

In some embodiments, the automated client interaction system 102 selects and implements an agent workflow at the agent device (e.g., a prompt, sequence of actions to take, or series of operations) based on the predicted client intent classifications. For example, if the automated client interaction system 102 predicts that a client seeks to open an account, the automated client interaction system 102 can present a workflow at the agent device to assist the client in opening an account.

Moreover, the agent device can display the predicted client intent classifications and/or client-agent escalation classes. The agent device can utilize the predicted client intent classifications/escalation classes in a variety of ways. For example, the automated client interaction system 102 provides the predicted client intent classifications/escalation classes directly to the agent device. This allows the agent device to know what the automated client interaction system 102 deems the reason for contact. The agent device can utilize the predicted client intent classifications/escalation classes to assist the client device.

Furthermore, in some implementations the automated client interaction system 102 provides the intent probabilities/escalation class probabilities along with the predicted client intent classifications/escalation classes. For example, if the automated client interaction system 102 determines "direct deposit status" as the predicted client intent classification with the corresponding intent classification probability of 85%, the automated client interaction system provides both the predicted client intent classification and the intent classification probability to the agent device. In particular, the provided probability allows the agent device to assess the confidence of the provided predicted client intent classifications/escalation classes.

Additionally, where the automated client interaction system 102 generates multiple predicted client intent classifications/escalation classes with multiple probabilities, the automated client interaction system 102 can provide all of these to the agent device. In particular, the automated client interaction system 102 can provide multiple classifications and probabilities to the agent device in order of highest to lowest with each classification listed with its corresponding probability. This allows the agent device to assess multiple predicted classifications along with the confidence level for each prediction.

In one or more embodiments, the automated client interaction system 102 utilizes the approach described by UTILIZING MACHINE LEARNING MODELS TO PREDICT CLIENT DISPOSITIONS AND GENERATE ADAPTIVE AUTOMATED INTERACTION RESPONSES, U.S. application Ser. No. 17/554,795, filed Dec. 17, 2021, which is incorporated herein by reference in its entirety. Similarly, the automated client interaction system 102 can utilize the approach described by UTILIZING MACHINE LEARNING MODELS TO GENERATE INTERACTIVE DIGITAL TEXT THREADS WITH PERSONALIZED DIGITAL TEXT REPLY OPTIONS, U.S. application Ser. No. 17/809, 765, filed Jun. 29, 2022, which is incorporated herein by reference in its entirety. For example, the automated client interaction system 102 can utilize multiple different intent thresholds and initiate a client-agent response session as described in U.S. application Ser. No. 17/554,795.

Figure 3A:
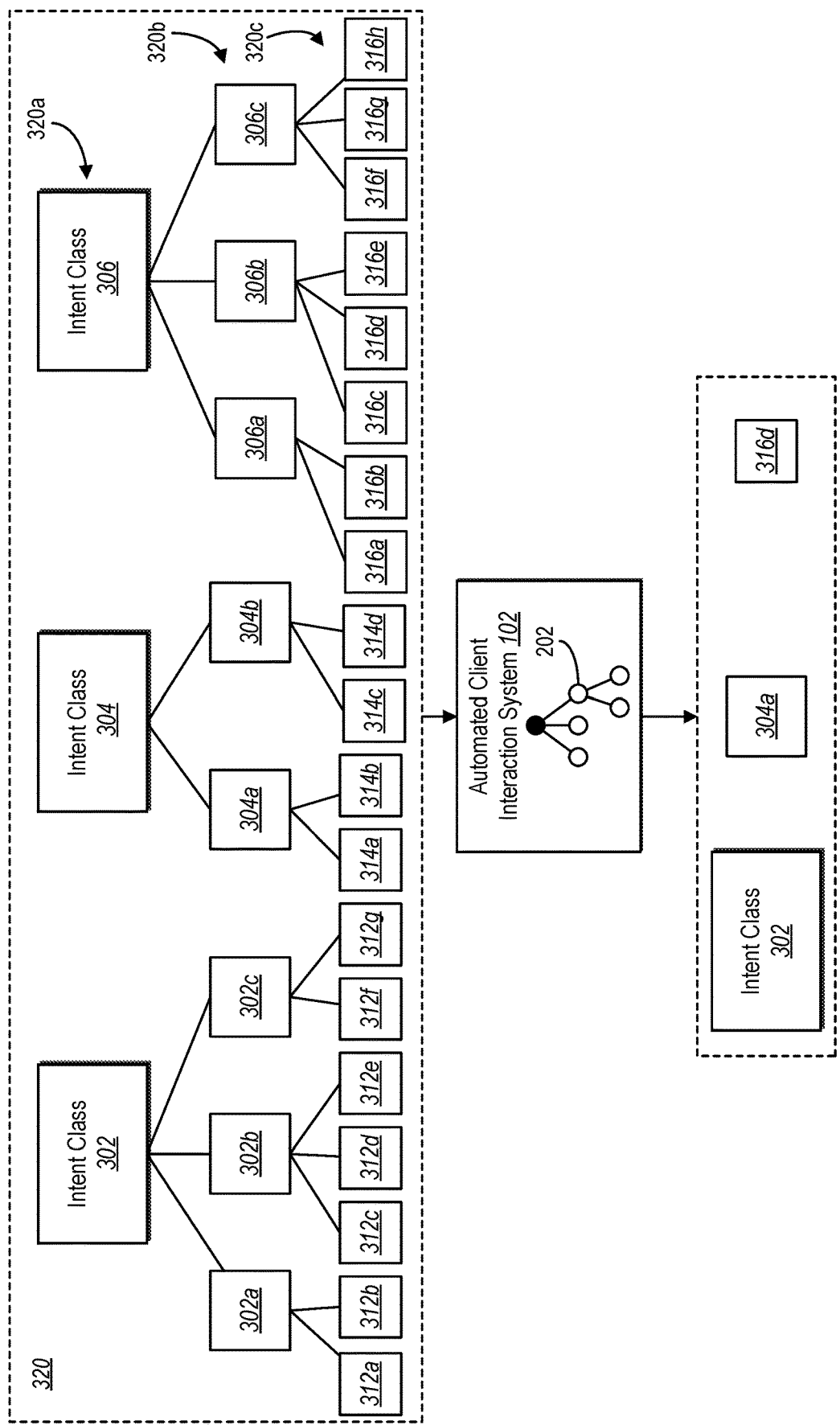
FIGS. 3A-3B illustrate an automated client interaction system selecting predicted client intent classifications from hierarchical intent architectures in accordance with one or more embodiments.
Figure 3B:
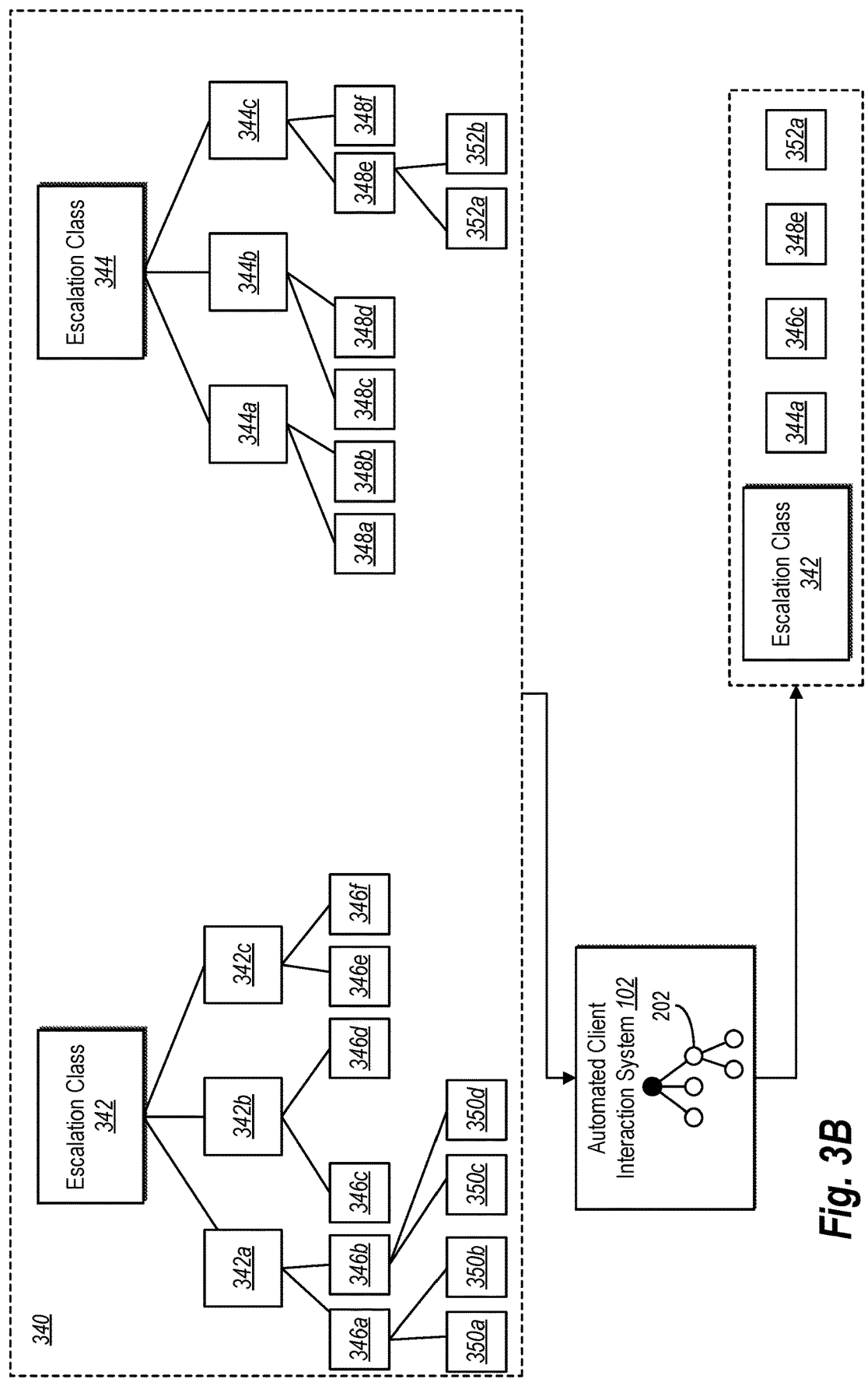

As mentioned above, in some embodiments, the automated client interaction system 102 identifies predicted client intent classifications and/or digital text reply options from a hierarchical architecture. Similarly, the automated client interaction system 102 can utilize an additional hierarchical architecture to predict client-agent escalation classes. For example, FIG. 3A illustrates selecting client intent classifications from a hierarchical intent architecture 320 in accordance with one or more embodiments. FIG. 3B illustrates selecting client-agent escalation classes from a hierarchical intent architecture in accordance with one or more embodiments.

As illustrated, the hierarchical intent architecture 320 includes a plurality of intent classifications (and/or digital text reply options) organized into a plurality of layers. Specifically, the hierarchical intent architecture 320 includes intent classes 302-306 in a first layer 320a. Each of the intent classes 302-306 corresponds to additional (e.g., children) intent classes in a second layer 320b. For example, the first intent class 302 has children intent classes 302a-302c. The intent classes 302a-302c are more specific sub-classes of the intent class 302. To illustrate, if the intent class 302 includes an intent class of "Query About SpotMe," the child intent class 302a can include a more specific intent class of "How to enroll in SpotMe."

As illustrated, the intent class 304 also has children intent classes 304a-304b while the intent class 306 has children intent classes 306a-306c. Thus, the children intent classes 302a-302c, 304a-304b, and 306a-306c fall within the second layer 320b of the hierarchical intent architecture 320.

Moreover, as shown, the hierarchical intent architecture 320 also includes a third layer 320c of additional intent classifications. For example, the child intent class 302a has two grandchild intent classes 312a-312b. These intent classes are more specific sub-classes of the child intent class 302a. Indeed, as shown, the child intent classes 302a-302c, 304a-304b, and 306a-306c have grandchild intent classes 312a-312g, 314a-314d, 316a-316h.

As mentioned above, in one or more embodiments, the automated client interaction system 102 utilizes a mapping between client intent classifications and digital text reply options. Thus, although described in terms of client intent classifications, the hierarchical intent architecture 320 can also be presented as a hierarchy of corresponding digital text reply options. Moreover, as mentioned previously, it can take significant time and computer resources to determine that a client device corresponds to one of the client intent classifications within this hierarchy.

As shown, the automated client interaction system 102 utilizes the machine learning model 202 to generate predicted client intent classifications (and/or corresponding digital text reply options). Specifically, the automated client interaction system 102 can generate predicted client intent classifications from different layers of the hierarchical intent architecture 320. Thus, as shown, the automated client interaction system 102 utilizes the machine learning model to select the intent class 302 from the first layer 320a, the intent class 304a from the second layer 320b, and the intent class 316d from the third layer 320c.

Specifically, the automated client interaction system 102 utilizes the machine learning model 202 to generate intent classification probabilities for intent classes in the hierarchical intent architecture 320. In some embodiments, the automated client interaction system 102 generates intent classification probabilities for a subset (e.g., 8, 10, 15 or 20) of the intent classes. In one or more embodiments, the automated client interaction system 102 generates intent classification probabilities for all of the intent classes. The automated client interaction system 102 then selects a subset of the intent classes based on the intent classification probabilities (e.g., the classes with the highest probabilities).

In some embodiments, the automated client interaction system 102 selects intent classes utilizing both the layer and the intent classification probabilities. In some implementations, the automated client interaction system 102 rewards intent classes selected from more specific layers (and/or penalizes intent classes selected from more general layers). Thus, for example, the automated client interaction system 102 can apply a bonus (e.g., a bonus 10% probability or other weight) to intent classes from the second layer 320b relative to the first layer 320a. Similarly, the automated client interaction system 102 can apply an additional bonus (e.g., a bonus 20% probability or other weight) to input classes from the third layer 320c. In some embodiments, the automated client interaction system 102 generates an overall selection score by applying a weighted combination to the intent classification probabilities and the layer of the hierarchical intent architecture. Thus, the automated client interaction system 102 can balance both intent classification probabilities and a level of specificity in identifying intent classes to select.

In one or more embodiments, the automated client interaction system 102 provides digital text reply options corresponding to these intent classes to a client device. In particular, the automated client interaction system 102 maps selected intent classes to digital text reply options and surfaces the digital text reply options to the client device. This allows the client device to efficiently and quickly select the most pertinent intent class, rather than having to sort through the levels 320a-320c of the hierarchical intent architecture 320.

Although FIG. 3A illustrates a particular size and shape of the hierarchical intent architecture 320, the automated client interaction system 102 can generate and access a variety of different architectures. For example, rather than having three layers, the automated client interaction system 102 can utilize a hierarchical intent architecture having four, five, or ten layers. Similarly, rather than having three intent classes on the first layer 320a, the automated client interaction system 102 can utilize a hierarchical intent architecture with five or ten intent classes on the first layer 320a. In addition, some classes in the first layer 320a may have more layers than others (e.g., some classes may have five layers while other classes only have two layers).

As shown in FIG. 3B, the automated client interaction system 102 can also utilize a hierarchical escalation class architecture 340 corresponding to escalation classes. Indeed, similar to the hierarchical intent architecture 320, the hierarchical escalation class architecture includes various escalation classes arranged in different dependent layers. Thus, for example, a first layer includes the escalation classes 342, 344. A second layer includes the escalation classes 342a-342c (i.e., children classes of the escalation class 342) and the escalation classes 344a-344c (i.e., children classes of the escalation class 344). Similarly, a third layer includes escalation classes 346a-346f and escalation classes 348a-348f and a fourth layer includes escalation classes 350a-350d and 352a-352b.

Moreover, as discussed above with respect to FIG. 3A, the automated client interaction system 102 can select escalation classes from a variety of different layers of the hierarchical escalation class architecture 340. Indeed, as illustrated, the automated client interaction system 102 selects the escalation class 342 (i.e., from the first layer), the escalation class 344a (e.g., from the second layer), the escalation class 346c (from the third layer), the escalation class 348e (from the third layer), and the escalation class 352a (from the fourth layer).

As discussed above, the automated client interaction system 102 can determine mappings between escalation classes and digital text reply options. Thus, for instance, the automated client interaction system 102 can determine a particular digital text reply option to include in an interactive digital text thread upon selection of the escalation class 346c. In some implementations, the automated client interaction system 102 generates the hierarchical escalation class architecture 340 with digital text reply options as the escalation classes.

In some implementations, the automated client interaction system 102 also determines mappings between escalation classes (from the hierarchical escalation class architecture 340) and intent classifications (from the hierarchical intent architecture 320). Indeed, as shown, in some implementations, the automated client interaction system 102 utilizes different hierarchies for escalation classes and intent classes. However, the automated client interaction system 102 can identify a correspondence or mapping between individual intent classifications and escalation classes. The automated client interaction system 102 can utilize such a mapping to generate digital text reply options. For example, the automated client interaction system 102 can identify corresponding classes and filter out duplicate classes in generating digital text reply options. In this manner, the automated client interaction system 102 can avoid providing duplicate text reply options within an interactive digital text thread.

Although FIG. 3B illustrates a separate hierarchical intent architecture, in some embodiments, the automated client interaction system 102 utilizes the same hierarchical intent architecture for determining intent classifications and escalation classes.

As mentioned above, the automated client interaction system 102 can generate and provide user interfaces that portray an automated interactive digital text thread having various messages and personalized digital text reply options. For example, FIGS. 4A-4C illustrate a client device 400 and a user interface 402 displaying an automated interactive digital text thread 404 in accordance with one or more embodiments.

Figure 4A:
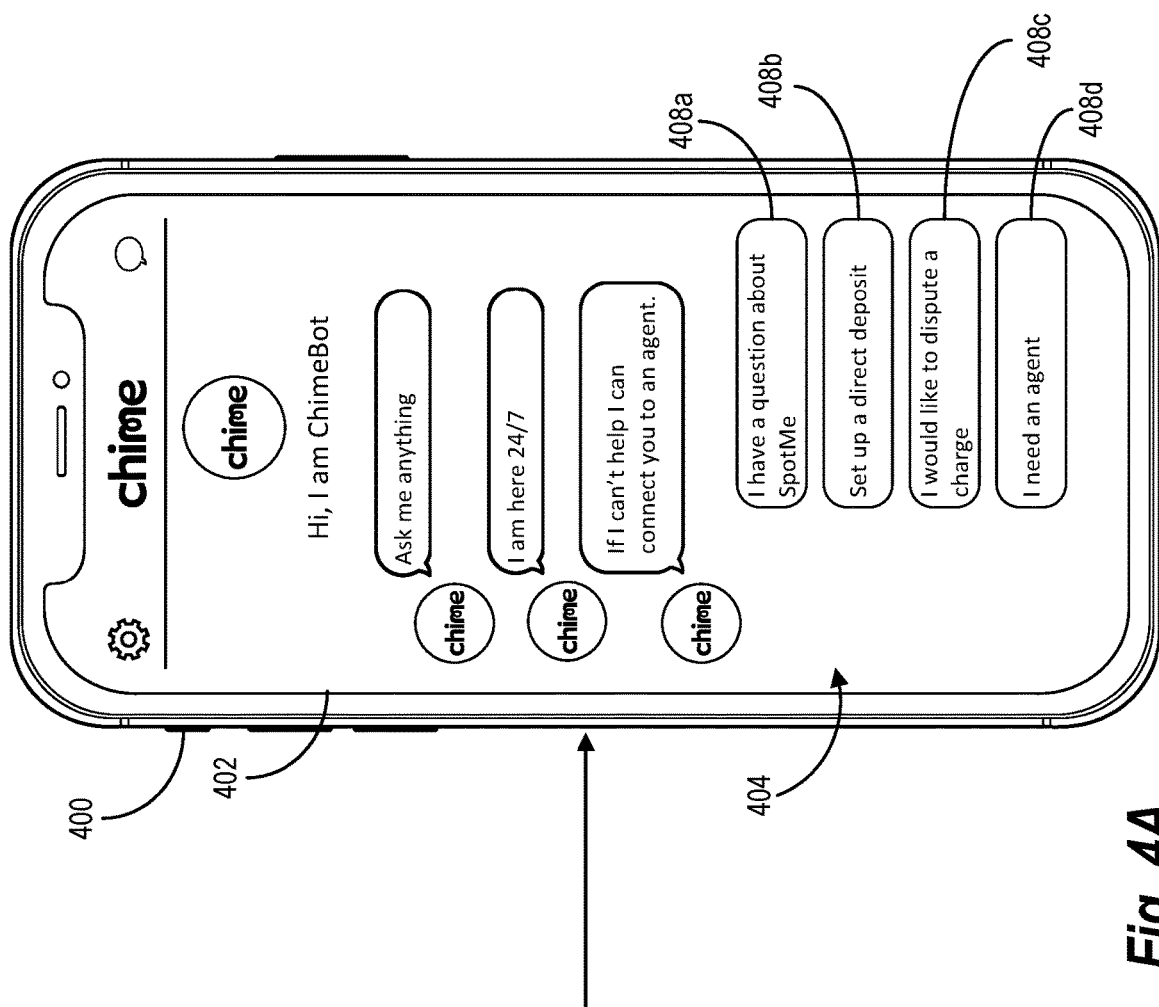
Figure 4A:
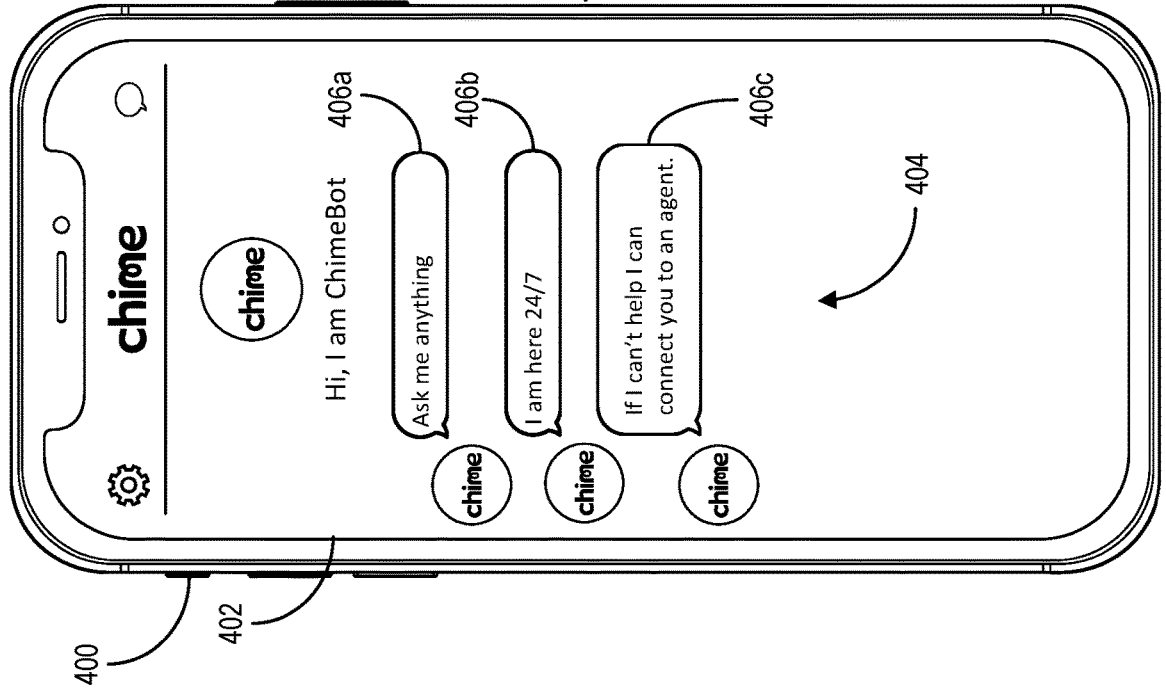
Figure 4C:
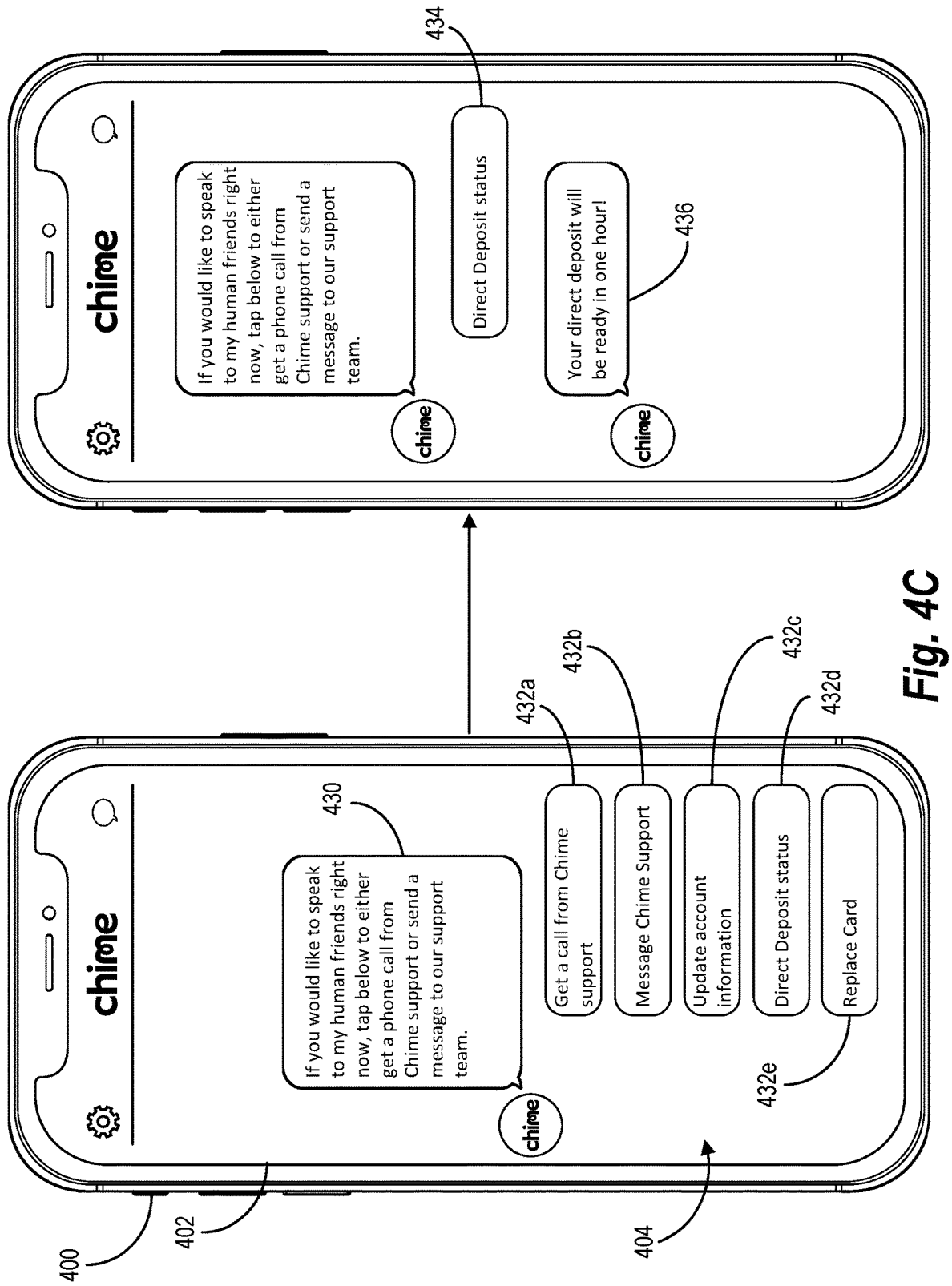

In particular, FIG. 4A illustrates the automated interactive digital text thread 404 displaying a set of initial messages 406a-406c. For example, after the client device 400 initiates the automated interactive digital text thread 404 (e.g., by selecting a "chat" user interface element), the automated client interaction system 102 generates the initial messages 406a-406c and provides the initial messages 406a-406c within the automated interactive digital text thread 404.

As mentioned, the automated client interaction system 102 also generates personalized digital text reply options to intelligently guide the client device 400 to pertinent information. For example, FIG. 4A illustrates the selectable digital text reply options 408a-408d. The automated client interaction system 102 generates the selectable digital text reply options 408a-408c utilizing a machine learning mode, as discussed above. In particular, the automated client interaction system 102 extracts client features and analyzes those client features utilizing a machine learning model to generate predicted client intent classifications and intent classification probabilities. The automated client interaction system 102 utilizes the intent classification probabilities to rank and select a subset of three predicted client intent classifications. The automated client interaction system 102 then maps the three predicted client intent classifications to the personalized, selectable digital text reply options 408a-408c.

The automated client interaction system 102 provides the selectable digital text reply option 408d as a pre-defined option. For example, in some implementations, the automated client interaction system 102 generates three personalized, selectable digital text reply options utilizing a machine learning model (and corresponding predicted client intent classifications) while utilizing one or more (e.g., 2 or 3) pre-defined digital text reply options (e.g., "I need an agent").

As illustrated, the automated client interaction system 102 provides the selectable digital text reply option 408d within the automated interactive digital text thread 404. Indeed, although the selectable digital text reply options 408d are not yet part of/added to the thread of communications (e.g., the selectable digital text reply options 408d are only visible to the client device 400 not the other party to the text thread), they are preliminarily provided within the automated interactive digital text thread 404 to efficiently provide options for guiding the client device 400 to pertinent information.

Notably, the automated client interaction system 102 can select the digital text reply options 408a-408c from different layers of a hierarchical intent architecture. Indeed, as discussed above with regard to FIG. 3A, the automated client interaction system 102 balances intent classification probabilities for client intent classifications from different layers of a hierarchical intent architecture to surface the digital text reply options 408a-408c. For example, the automated client interaction system 102 utilizes a machine learning model to generate predicted intent classifications and corresponding intent classification probabilities. The automated client interaction system 102 then compares the intent classification probabilities to select a subset of intent classifications.

In response to detecting user interaction with the selectable digital text reply options 408a-408d, the automated client interaction system 102 can generate a digital text response within the automated interactive digital text thread 404. For example, FIG. 4B illustrates the user interface 402 upon selection of the digital text reply option 408a. As illustrated, the automated client interaction system 102 generates and provides a digital text response 410 within the automated interactive digital text thread 404. In one or more implementations, the digital text response 410 reflects the intent classification corresponding to the selected digital text reply option. In some embodiments, the automated client interaction system 102 generates the digital text response 410 based on a mapping between the digital text reply option and a corresponding text response. Thus, for example, the automated client interaction system 102 can have a pre-determined mapping between the digital text reply option 408a and the digital text response 410.

As illustrated, the automated client interaction system 102 also generates and provides a digital message 412 within the automated interactive digital text thread 404. The digital message 412 acknowledges and clarifies the intent reflected in the digital text response 410. The automated client interaction system 102 can also utilize a pre-defined mapping to determine the digital text response 410. In some embodiments, the automated client interaction system 102 utilizes a machine learning model to generate text corresponding to a particular option. For example, the automated client interaction system 102 can utilize a recurrent neural network to generate a text response based on previous messages within the automated interactive digital text thread 404.

As shown in FIG. 4B, the automated client interaction system 102 also generates an additional plurality of selectable digital text replies. In particular, the automated client interaction system 102 generates the selectable digital text reply options 414a-414d. In some embodiments, the automated client interaction system 102 generate the digital text reply options 414a-414d utilizing a pre-defined hierarchical architecture (e.g., as illustrated in FIG. 3A). For example, upon determining a client intent classification, the automated client interaction system 102 then provides the digital text replies 414a-414d using the next layer within the hierarchical architecture (e.g., generates digital text replies that correspond to the next layer of intent classes).

In some embodiments, the automated client interaction system 102 utilizes a machine learning model to generate the selectable digital text reply options 418a-418d. For example, the automated client interaction system 102 filters intent classes from the hierarchical architecture to generate a subset of intent classes (e.g., those intent classes within the family corresponding to the selected digital text reply option). The automated client interaction system 102 can utilize the machine learning model to generate predicted client intent classifications from the subset of intent classes. The automated client interaction system 102 can then rank the predicted client intent classifications, select an additional set of predicted client intent classifications, and generate the selectable digital text reply options 418a-418d. Notably, the automated client interaction system 102 can also draw the selectable digital text reply options 418a-418d from multiple layers of a hierarchical architecture.

Upon selection of a digital text reply option from the digital text reply options 408a-408d, the automated client interaction system 102 can initiate a different process or protocol based on the selected digital text reply option. For example, in response to selection of the digital text reply option 408d ("I need an agent"), the automated client interaction system 102 can generate a text response (e.g., "Would you like to communicate with an agent") and/or initiate a client-agent response session (e.g., by initiating communication between the client device 400 and an agent device). For instance, the automated client interaction system 102 can initiate a text thread between an agent device (e.g., with a human operator) and the client device 400. Similarly, the automated client interaction system 102 can initiate an oral conversation (e.g., a telephone call or digital call) between the client device 400 and an agent device. In some implementations, the automated client interaction system 102 provides separate options for initiating a chat session or telephone session with an agent.

As shown in FIG. 4B in response to a user interaction with one of the selectable digital text reply options 418a-418d, the automated client interaction system 102 generates an additional digital text response 416 and adds the digital text response 416 to the automated interactive digital text thread 404. In addition, the automated client interaction system 102 generates and provides a digital message 418. As shown, the digital message 418 provides the information requested in the digital text response 416.

Moreover, the automated client interaction system 102 can also provide an escalation option 420. For instance, if the digital message 418 fails to provide the information sought, the automated client interaction system 102 can detect an interaction with the escalation option 420 and provide additional information.

Although FIGS. 4A-4B illustrate a particular set of messages, text replies, and selectable options, the automated client interaction system 102 can utilize a variety of different messages, replies or options. Indeed, in some implementations, the automated client interaction system 102 provides fewer, additional, or different selectable digital text reply options; additional, fewer, or different digital messages; and additional, fewer, or different text responses.

In some implementations, the automated client interaction system 102 can prompt the client device 400 to provide a text input describing a purpose for an interaction. The automated client interaction system 102 can generate such a prompt based on a variety of factors. For instance, in some embodiments, the automated client interaction system 102 asks the client to provide a statement regarding the purpose of initiating an automated interactive digital text thread if the intent classification probabilities fail to satisfy an intent classification threshold. In some embodiments, the automated client interaction system 102 prompts the client device 400 to provide a statement based on time (e.g., based on the time since the last interaction between the client device and the automated client interaction system 102).

In one or more implementations, the automated client interaction system 102 determines that the predicted client intent classifications do not align with the actual intent of the digital account or the client device 212. For example, if the automated client interaction system 102 provides the selectable digital text reply options and the client device 400 provides a user interaction indicating that none of the options apply, then the automated client interaction system 102 can initiate an alternate set of acts (e.g., initiate a client-agent response session, present a pre-defined list of menu options, or present a second set of selectable digital text reply options particular to a second set of predicted client intent classifications). In some embodiments, the automated client interaction system presents a pre-defined or standardized list of menu options upon determining that no predicted client intent classifications satisfy an intent classification threshold.

In some implementations, the automated client interaction system 102 provides the selectable digital text reply options within a threshold period of time (e.g., 3-60 seconds) after the client device 400 contacts the automated client interaction system 102. For example, in a circumstance where the client device 400 is authenticated within two seconds, the automated client interaction system 102 provides the digital text reply options within 3-5 seconds. In certain example embodiments, if the automated client interaction system 102 is unable to generate predicted client intent classifications and corresponding text reply options within a threshold time frame, the automated client interaction system 102 presents a list of pre-defined menu options for the client device 400.

Although FIG. 4A illustrates the automated client interaction system 102 providing the digital text reply options 408a-408d without any initial messages or text inputs from the client device 400, the automated client interaction system 102 can provide the digital text reply options 408a-408d at different times and/or within a sequence of other responses. For example, in some implementations, the automated client interaction system 102 provides a predefined set of menu options while the automated client interaction system 102 determines predicted client intent classifications. Upon identifying the predicted client intent classifications, the automated client interaction system 102 can provide the digital text reply options 408a-408d at an identified point (e.g., a junction point) within the automated interactive digital text thread 404.

In some embodiments, the automated client interaction system 102 generates predicted client intent classifications and digital text reply options in real-time (e.g., in response to initiating the automated interactive digital text thread 404). In some implementations, the automated client interaction system 102 generates predicted client intent classifications and digital text reply options utilizing a particular time schedule or frequency. For example, in one or more embodiments, the automated client interaction system 102 generates predicted client intent classifications for digital accounts every hour. For example, even when the client device 400 has not contacted the automated client interaction system 102, the automated client interaction system 102 generates predicted client intent classifications. In particular, this example embodiment allows for the automated client interaction system 102 to present the prediction to the client device 400 immediately upon contact.

Although the foregoing embodiments describe utilizing a machine learning model to generated predicted client intent classifications, in one or more implementations the automated client interaction system 102 uses a heuristic model in tandem with a machine learning model to generate the predicted client intent classifications. For example, if the client device 400 has contacted the automated client interaction system 102 ten times in a day for the same reason, then if the client device 400 contacts the automated client interaction system 102 for the eleventh time that day, the automated client interaction system 102 can utilize the heuristic model to determine the client intent. Or, if the client device 400 unsuccessfully signs into a device application, the heuristic model can apply one or more rules to determine the predict client intent corresponds to the unsuccessful login.

To illustrate, the heuristic model could include certain rules that take precedence over the predictions generated by the machine learning model, or vice-versa. In particular, the rule-based prediction can use application programming interfaces (APIs) to retrieve client features from a third-party server. Based on the retrieved client features, the automated client interaction system 102 determines whether to give priority to the rule-based model or the machine learning model.

In certain example embodiments, the automated client interaction system 102 also utilizes a time threshold for analyzing client features corresponding to a client device. For example, in applying a heuristic model, the automated client interaction system 102 can utilize a time threshold of one day. In such a circumstance, the automated client interaction system 102 can analyze the client features that reflect user activity within the previous day, but ignore the client features that exceed the one-day threshold. Moreover, if the client features all reflect user information outside of the time threshold, then the automated client interaction system 102 can refrain from generating a prediction utilizing the heuristic model.

As mentioned above, in some embodiments, the automated client interaction system 102 also generates escalation digital text reply options utilizing an agent escalation machine learning model. Indeed, as discussed with regard to FIGS. 4A-4B the automated client interaction system 102 can provide various escalation options via the automated interactive digital text thread 404. For instance, the automated client interaction system 102 can provide the digital text reply option 408d (i.e., a selectable option to escalate to a client-agent session) or the escalation option 420. In some embodiments, upon detecting user interaction with an escalation option, the automated client interaction system 102 utilizes an escalation machine learning model to determine predicted client-agent escalation classes and provide corresponding escalation digital text reply options for display. For example, FIG. 4C illustrates the user interface 402 of the client device 400 upon selection of an escalation option (e.g., upon selection of the escalation option 420).

As shown, the automated client interaction system 102 provides an additional message 430 and digital text reply options 432a-432e, including the customized escalation digital text reply options 432c-432e. Specifically, the automated client interaction system 102 analyzes features corresponding to the client device 400 utilizing an escalation machine learning model to determine client-agent escalation classes and corresponding escalation class probabilities. The automated client interaction system 102 utilizes the escalation class probabilities to select a subset of client-agent escalation classes (e.g., 3 or 5 classes). Moreover, the automated client interaction system 102 determines the escalation digital text reply options 432c-432e corresponding to the selected subset of client-agent escalation classes.

As discussed above, because the automated client interaction system 102 can train the escalation machine learning model particularly to predict client-agent escalation classes, the automated client interaction system 102 surfaces the escalation digital text reply options 432c-432e to more accurately and efficiently identify escalation purposes. This can assist the client device 400 in avoiding the need to initiate a client-agent response session by initiating a self-service workflow instead.

For example, with regard to FIG. 4C, the automated client interaction system 102 detects user interaction with the digital text reply option 432d. In response, the automated client interaction system 102 initiates a self-service workflow. As used herein, a self-service workflow refers to a process or set of interactions for a client device to obtain information. In particular, a self-service workflow includes a process to request and obtain information via an automated interactive digital text thread (e.g., without interacting directly with an agent or agent device).

As shown in FIG. 4C, the automated client interaction system 102 initiates a self-service workflow by providing a first digital message 434 indicating the selected digital text reply option and a second digital message 436 providing information related to the selected digital text reply option (e.g., information corresponding to the client-agent escalation class). Specifically, in response to selection of the digital text reply option 432d, the automated client interaction system 102 determines that the client device 400 is requesting information regarding a particular client-agent escalation class (i.e., "Direct Deposit Status"). In response, the automated client interaction system 102 performs a query regarding the client-agent escalation class. For example, the automated client interaction system 102 performs a query (to another server or system component) for current direct deposits pending for the client account and the current status. Upon identifying a response to the query, the automated client interaction system 102 then provides the second digital message 436 indicating the pertinent information.

In some embodiments, the self-service workflow involves a variety of additional messages and interactions. For example, the automated client interaction system 102 can request additional information (e.g., "which direct deposit would you like to inquire about") and provide a variety of incremental responses. To illustrate, the automated client interaction system 102 can provide a first digital message confirming the provider of the direct deposit (i.e., "please confirm that you are asking about a direct deposit from Acme, Corp."). With that confirmation, the automated client interaction system 102 can then provide a second digital message with the requested information. Moreover, although FIG. 4C illustrates a particular self-service workflow, the automated client interaction system 102 can provide a variety of different workflows (e.g., a workflow to obtain information regarding a check deposit, to open an account, to resolve a dispute, etc.).

In some implementations, the automated client interaction system 102 cannot resolve a client device query via a self-service workflow. In such circumstances, the automated client interaction system 102 can initiate a client-agent session and utilize the predicted client-agent escalation class to make the client-agent session more efficient. For example, the automated client interaction system 102 can provide one or more predicted client-agent escalation classes for display via a client device and/or agent device to guide the client device and/or agent device to a resolution.

Although FIGS. 4A-4C illustrate utilizing an intent machine learning model to generate digital text reply options and then utilizing an escalation machine learning model to generate an escalation digital text reply options, the automated client interaction system 102 can utilize a different approach. For example, in some embodiments, the automated client interaction system 102 utilizes an escalation machine learning model to generate the digital text reply options 414a-414c. The automated client interaction system 102 can then utilize the escalation machine learning model to generate the digital text reply options 432a-432c upon selection of an escalation option (e.g., the escalation option 420). The automated client interaction system 102 can utilize an escalation machine learning model at a variety of resolution points to initiate self-serve workflows.

Figure 5A:
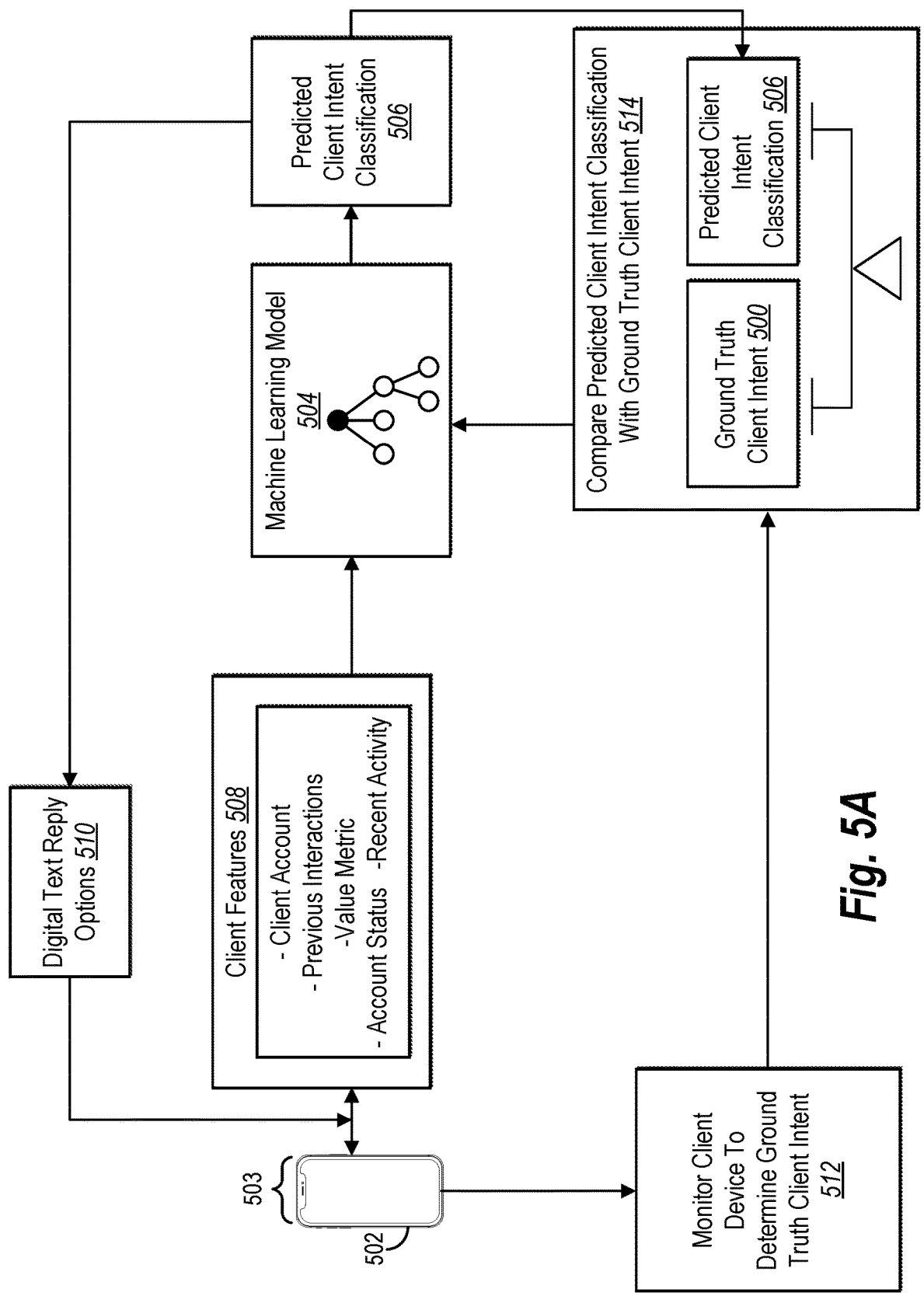
FIGS. 5A-5B illustrate an example diagram of an automated client interaction system training a machine learning model and an agent escalation machine learning model in accordance with one or more embodiments.
Figure 5B:
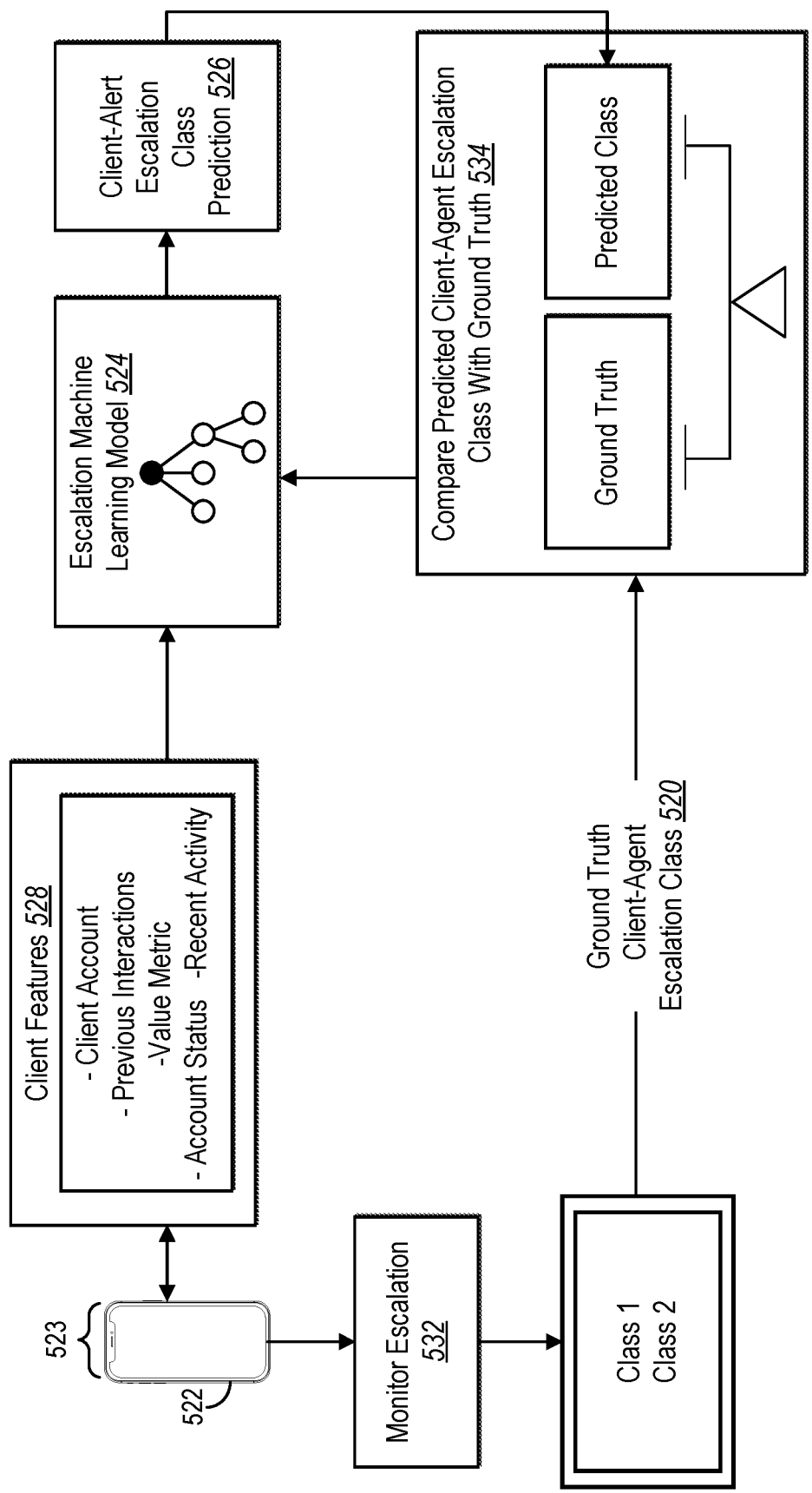

As discussed above, the automated client interaction system 102 can train machine learning models for predicting intent classifications and/or client-agent escalation classes. For example, FIG. 5A illustrates an overview of monitoring a client device 502 with device application 503 to determine a ground truth client intent 500 and train a machine learning model 504. Similarly, FIG. 5B illustrates training an escalation machine learning model 524.

As illustrated in FIG. 5A, the automated client interaction system 102 extracts client features 508 that correspond with the client device 502 and utilizes the machine learning model 504 to generate predicted client intent classifications 506. In response, the automated client interaction system 102 generates digital text reply options 510 and provides the digital text reply options 510 to the client device 502.

As shown, the automated client interaction system 102 performs an act 512 of monitoring interactions with the client device 502 to determine the accuracy of the predicted client intent classifications 506. For example, the client device 502 can provide a user interaction confirming (or denying) the accuracy of the predicted client intent classifications 506. Similarly, the automated client interaction system 102 can monitor additional user interactions, such as information ultimately provided to the client device 502 or information requested from an agent device. The automated client interaction system 102 can determine the ground truth intent from these interactions. Accordingly, the automated client interaction system 102 monitors the client device 502 (and/or agent device interactions) to determine ground truth client intents.

As mentioned, the automated client interaction system 102 can further train the machine learning model 504 based on the ground truth client intent 500. For example, the automated client interaction system 102 performs an act 514 of comparing the predicted client intent classification 506 with the ground truth client intent 500. In particular the automated client interaction system 102 compares the predicted client intent classification 506 and the ground truth client intent 500 with a loss function. A loss function can determine a measure of loss between the predicted client intent classification 506 and the ground truth client intent 500. In some implementations, the automated client interaction system 102 utilizes a multi-log loss for multi-class classification. The loss function can also include mean absolute error (L1) loss functions, mean squared error (L2) loss functions, cross entropy loss functions, or Kullback-Leibler loss.

The automated client interaction system 102 trains the machine learning model 504 based on the comparison between the predicted client intent classifications 506 and the ground truth client intent 500. For example, the automated client interaction system 102 can modify nodes of a decision tree model (e.g., a random forest model) based on the measure of loss from the loss function. Similarly, the automated client interaction system 102 can modify internal weights or parameters of a neural network (e.g., via back propagation) to reduce the measure of loss. On subsequent interactions between client devices and the automated client interaction system 102, the machine learning model 504 provides improved predicted client intent classifications.

In one or more implementations, the automated client interaction system 102 selects or tunes hyperparameters for the machine learning model 504. For example, the automated client interaction system 102 can perform random search hyperparameter tuning (e.g., utilizing Optuna or another model) to select hyperparameters for the machine learning model 504.

In some embodiments, the automated client interaction system 102 selects a particular set of intent classifications for training the machine learning model 504. For example, in some embodiments, the automated client interaction system 102 monitors user interaction with personalized digital text reply options and selects a certain number or percentage of intent classes based on these interactions. For example, the automated client interaction system 102 can select the top eight or ten client intent classifications based on the digital text reply options selected by client devices. To illustrate, the automated client interaction system 102 can select dispute status, how do I become eligible for SpotMe, set up direct deposit, how do I deposit money into my account, mobile check deposit, and new dispute claim as the intent classes for training and implementing the machine learning model 504.

In some implementations, the automated client interaction system 102 utilizes a particular algorithm or approach for selecting and preparing features for training the machine learning model 504. For example, in some implementations, the automated client interaction system 102 generates bins for features that include numerical ranges. Thus, for example, the automated client interaction system 102 bins age and/or income features to create categorical features. Moreover, in some implementations, the automated client interaction system 102 generates encodings from these categorical features.

In one or more embodiments, the automated client interaction system 102 also takes steps to mitigate imbalances in training data (e.g., long tail problem for predicted classes). For example, in some implementations, the automated client interaction system 102 groups parent-child intents (or corresponding text reply options). To illustrate, the automated client interaction system 102 can train a general "SpotMe" intent class by combining all child classes under the "SpotMe" intent class within the hierarchical structure. Similarly, in some embodiments, the automated client interaction system 102 maps similar intents/reply options into a larger category (e.g., lost credit card and lost debit card are combined into lost card).

Moreover, in some implementations, the automated client interaction system 102 considers only one unique session in a training dataset per client (e.g., to remove correlated sessions that would skew training results). For instance, the automated client interaction system 102 can utilizes the latest session by the client device within a data selection time period. In one or more embodiments, the automated client interaction system 102 utilizes a synthetic minority oversampling approach to address imbalance problems.

Upon training, the automated client interaction system 102 can utilize the machine learning model 504 to further generate predicted client intent classifications. For example, in some embodiments, the automated client interaction system 102 generates batch predictions for a population of clients at a certain frequency (e.g., every hour) even if the clients have not provided a client query (e.g., have not initiated a call or text session). In other implementations, the automated client interaction system 102 utilizes the machine learning model 504 to make real-time predictions as client devices initiate automated interactive digital text threads.

As mentioned above, FIG. 5B illustrates training the escalation machine learning model 524. Similar to the machine learning model 504, the automated client interaction system 102 extracts client features 528 that correspond with a client device 522 (having a device application 523) and utilizes the escalation machine learning model 524 to generate client-agent escalation class predictions 526. The automated client interaction system 102 then compares the client-agent escalation class predictions 526 with a ground truth client-agent escalation class (e.g., utilizing a loss function as described above).

In one or more implementations, the automated client interaction system 102 determines a ground truth client-agent escalation class based on the results of client-agent sessions. In particular, as shown, the automated client interaction system 102 can perform an act 532 of monitoring escalations. In some implementations, the automated client interaction system 102 performs the act 532 by obtaining labeled ticket classifications from one or more agent devices. For example, an agent device can participate in a client-agent session and select a client-agent escalation class corresponding to the session. The automated client interaction system 102 can access these classification labels and use them as ground truth client-agent escalation classes for training the escalation machine learning model 524.

In particular, based on a measure of loss between the ground truth client-agent escalation classes 520 and the client-agent escalation class predictions 526, the automated client interaction system 102 trains the escalation machine learning model 524. For example, the automated client interaction system 102 can modify nodes of a decision tree model (e.g., a random forest model) based on the measure of loss from the loss function. Similarly, the automated client interaction system 102 can modify internal weights or parameters of a neural network (e.g., via back propagation) to reduce the measure of loss.

In some implementations, the automated client interaction system 102 trains an intent machine learning model and an escalation machine learning model at different levels of specificity/granularity. For example, in some embodiments, the automated client interaction system 102 trains a first machine learning model (e.g., the intent machine learning model) based on a particular layer of a hierarchical intent architecture (e.g., a first layer of a first hierarchy) and trains a second machine learning model (e.g., the escalation machine learning model) based on a more specific layer of a hierarchical intent architecture (e.g., a second layer of a second hierarchy). In particular, predicted and ground truth classes can correspond to different layers of a hierarchy depending on the particular machine learning model.

In addition, in some implementations, the automated client interaction system 102 provides a different number of digital text reply options depending on the machine learning model utilized and/or the amount of progress/time within an automated interactive digital text thread. For example, in some implementations, the automated client interaction system 102 provides three personalized digital text reply options in an initial/welcome stage (e.g., using an intent machine learning model). Later in an automated interactive digital text thread (e.g., upon selection of an escalation option), the automated client interaction system 102 can provide five personalized digital text reply options.

As mentioned above, researchers have conducted experiments to analyze the accuracy of experimental embodiments of the automated client interaction system 102. For example, FIG. 6A illustrates experimental results of the accuracy of exemplary machine learning model (e.g., as described in relation to FIG. 5A). As illustrated, researchers measured accuracy of an intent prediction machine learning models utilizing three architectures: XgBoost, LightGBM, and CatBoost. As shown, in generating three predicted client intent classifications, these three architectures achieved an accuracy of more than 70%. Moreover, the LightGBM implementation achieves an accuracy of 82%.

In addition, researchers have also conducted experimentation to determine reduction in resources utilized to respond to client devices. Specifically, researchers conducted a 28-day A/B test with a 50:50 split implementing an experimental embodiment of the automated client interaction system 102. The testing indicated 3000 fewer client device escalation interactions per week (or approximately 150,000 fewer per year). The testing also indicated that client devices utilize personalized digital text replies 5 times more frequently relative to predefined options.

Researchers have also conducted experimentation regarding the accuracy of escalation machine learning models. For example, FIG. 6B illustrates the results of experimentation regarding the accuracy of an exemplary machine learning model (e.g., as described in relation to FIG. 5B). As illustrated, researchers measured accuracy of an escalation prediction machine learning models utilizing three architectures: XgBoost, LightGBM, and Random Forest. As shown, in generating five predicted client intent classifications, these three architectures achieved an accuracy of more than 75%. Moreover, the LightGBM implementation achieves an accuracy of 85%.

Figure 6C:
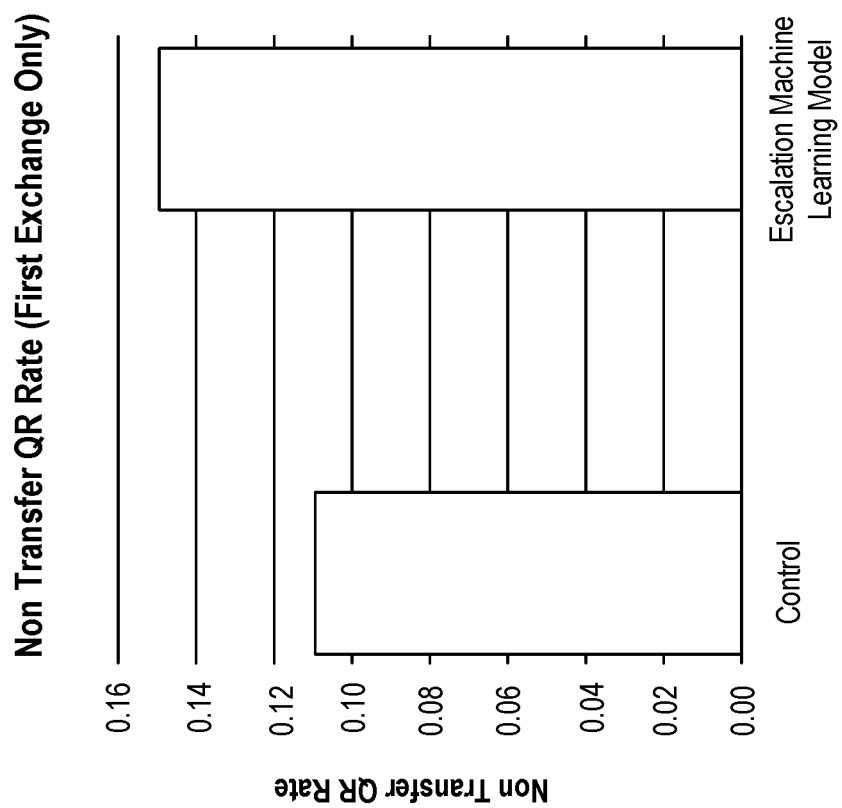

In addition, researchers have also conducted experiments regarding the efficacy of reducing escalation computer procedures in utilizing different machine learning models. For example, FIG. 6C illustrates a non-transfer rate resulting from utilizing an intent machine learning model (e.g., trained as described above in relation to FIG. 5A) and an escalation machine learning model (e.g., trained as described above in relation to FIG. 5B). As shown, generating digital text reply options utilizing the escalation machine learning model has resulted in a significant increase in non-transfer rate.

In addition, researchers have also conducted experiments regarding escalation resulting from utilizing an intent machine learning model and an escalation machine learning model. Experimentation indicates that an escalation machine learning model improves escalation rates by more than 1% relative to an intent machine learning model. This improvement has a significant impact on the time and computational resources of client devices and corresponding agent devices.

FIGS. 1-6C, the corresponding text, and the examples provide a number of different systems, methods, and non-transitory computer readable media for generating personalized digital text reply options in an automated interactive digital text thread. In addition to the foregoing, embodiments can also be described in terms of flowcharts comprising acts for accomplishing a particular result. For example, FIG. 7 illustrates a flowchart of an example sequence of acts in accordance with one or more embodiments.

Figure 7:
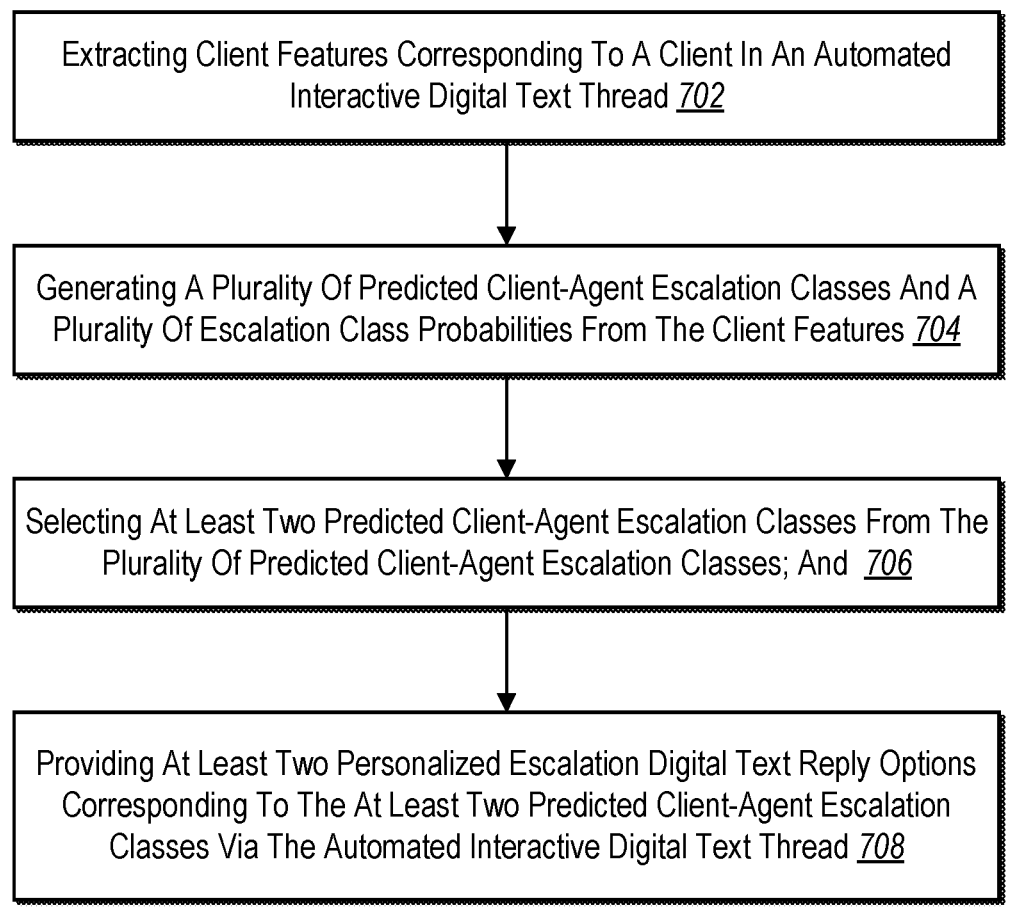
FIG. 7 illustrates an example series of acts for generating personalized digital text reply options in an automated interactive digital text thread in accordance with one or more embodiments.

While FIG. 7 illustrates acts according to some embodiments, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7. Additionally, the acts described herein may be repeated or performed in parallel with one another or in parallel with different instances of the same or other similar acts.

FIG. 7 illustrates an example series of acts 700 for generating personalized digital text reply options in an automated interactive digital text thread. The series of acts 700 can include an act 702 of extracting client features corresponding to a client in an automated interactive digital text thread; an act 704 of generating a plurality of predicted client-agent escalation classes and a plurality of escalation class probabilities from the client features; an act 706 of selecting at least two predicted client-agent escalation classes from the plurality of predicted client-agent escalation classes; and an act 708 of providing at least two personalized escalation digital text reply options corresponding to the at least two predicted client-agent escalation classes via the automated interactive digital text thread.

For example, in one or more embodiments, the acts 702-708 include extracting client features corresponding to a client device participating in an automated interactive digital text thread; generating, utilizing an escalation machine learning model, a plurality of predicted client-agent escalation classes and a plurality of escalation class probabilities from the client features; selecting at least two predicted client-agent escalation classes from the plurality of predicted client-agent escalation classes utilizing the plurality of escalation class probabilities; and providing, for display via the client device, at least two personalized escalation digital text reply options corresponding to the at least two predicted client-agent escalation classes via the automated interactive digital text thread.

In one or more implementations, the series of acts 700 includes training the escalation machine learning model by: generating a plurality of client-agent escalation class predictions from a set of training client features corresponding to client devices; generating a measure of loss by comparing, utilizing a loss function, the plurality of client-agent escalation class predictions with ground truth client-agent escalation classes generated from agent devices that interacted with the client devices; and modifying parameters of the escalation machine learning model based on the measure of loss.

Moreover, in some embodiments, the series of acts 700 includes in response to user interaction with a personalized digital text reply option of the at least two personalized escalation digital text reply options corresponding to a predicted client-agent escalation class, initiating a client self-service workflow corresponding to the predicted client-agent escalation class.

In addition, in some implementations the series of acts 700 includes providing a selectable escalation option within the automated interactive digital text thread; and in response to detecting a user interaction with the selectable escalation option, providing the at least two personalized escalation digital text reply options corresponding to the at least two predicted client-agent escalation classes for display.

Furthermore, in some implementations, the series of acts 700 includes generating, utilizing an intent machine learning model different from the escalation machine learning model, a plurality of predicted client intent classifications different from the plurality of predicted client-agent escalation classes; and providing, for display via the client device, at least two personalized intent digital classification options corresponding to at least two predicted client intent classifications of the plurality of predicted client intent classifications via the automated interactive digital text thread.

In some embodiments, utilizing the escalation machine learning model comprises generating the plurality of predicted client-agent escalation classes and the plurality of escalation class probabilities utilizing one or more of a random forest model or gradient boosted decision tree model.

Moreover, in one or more embodiments, extracting client features comprises one or more of determining a digital account value, a direct deposit status of a digital account, or application device activity on the digital account.

In addition, in one or more embodiments, the series of acts 700 includes in response to detecting an escalation interaction via the automated interactive digital text thread, initiating a client-agent response session between the client device and an agent device; and providing, for display, one or more of the plurality of predicted client-agent escalation classes to the agent device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
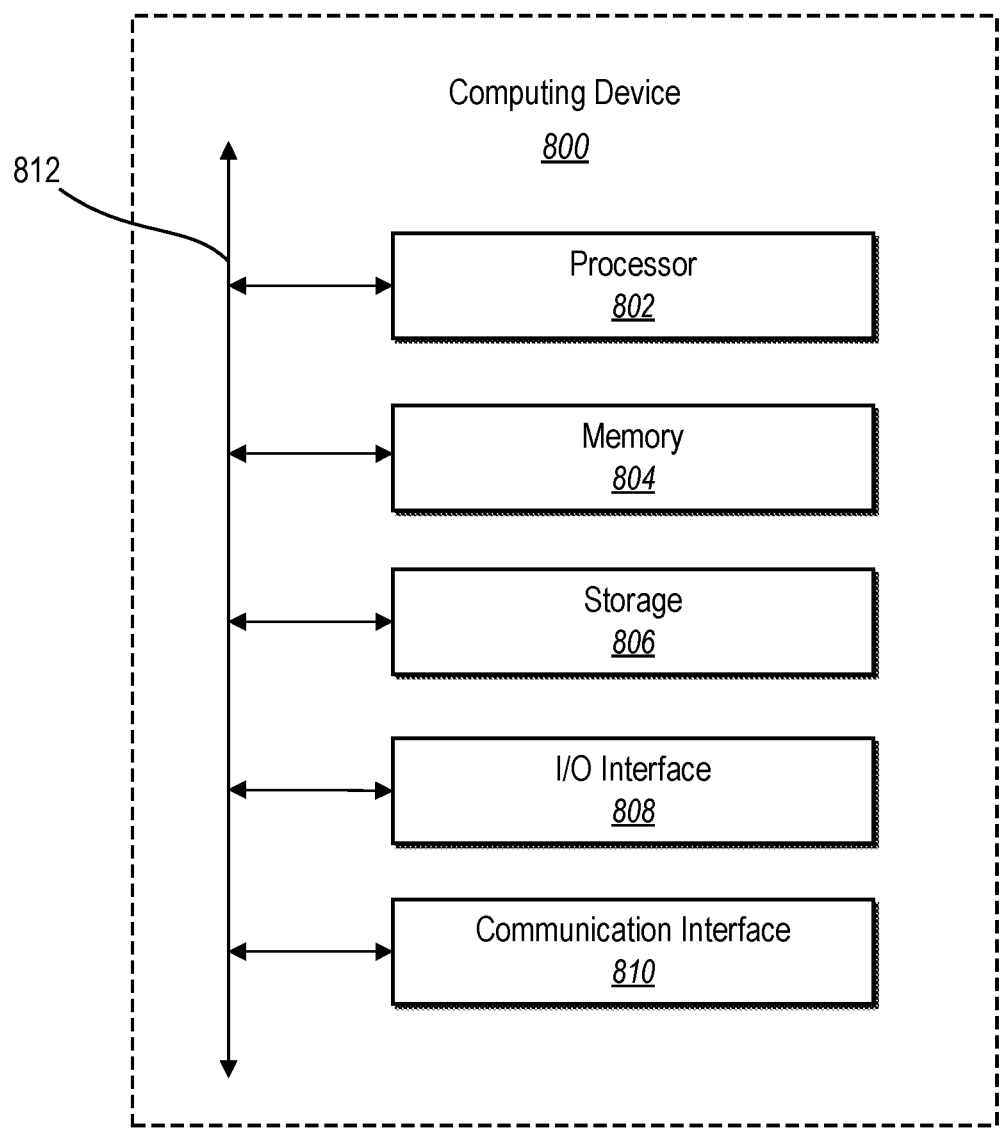
FIG. 8 illustrates a block diagram of a computing device for implementing one or more embodiments of the present disclosure.

FIG. 8 illustrates, in block diagram form, an exemplary computing device 800 (e.g., the client device 108, or the server(s) 106) that may be configured to perform one or more of the processes described above. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, storage device 806 can comprise a non-transitory storage medium described above. The storage device 806 may include a hard disk drive ("HDD"), flash memory, a Universal Serial Bus ("USB") drive or a combination of these or other storage devices.

The computing device 800 also includes one or more input or output interface 808 (or "I/O interface 808"), which are provided to allow a user (e.g., requester or provider) to provide input to (such as user strokes), receive output from, and otherwise transfer data to and from the computing device 800. These I/O interface 808 may include a mouse, keypad or a keyboard, a touch screen, camera, optical scanner, network interface, modem, other known I/O devices or a combination of such I/O interface 808. The touch screen may be activated with a stylus or a finger.

The I/O interface 808 may include one or more devices for presenting output to a user, including, but not limited to, a graphics engine, a display (e.g., a display screen), one or more output providers (e.g., display providers), one or more audio speakers, and one or more audio providers. In certain embodiments, interface 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller ("NIC") or network adapter for communicating with an Ethernet or other wire-based network or a wireless NIC ("WNIC") or wireless adapter for communicating with a wireless network, such as a WI-FI. The computing device 800 can further include a bus 812. The bus 812 can comprise hardware, software, or both that connects components of computing device 800 to each other.

Figure 9:
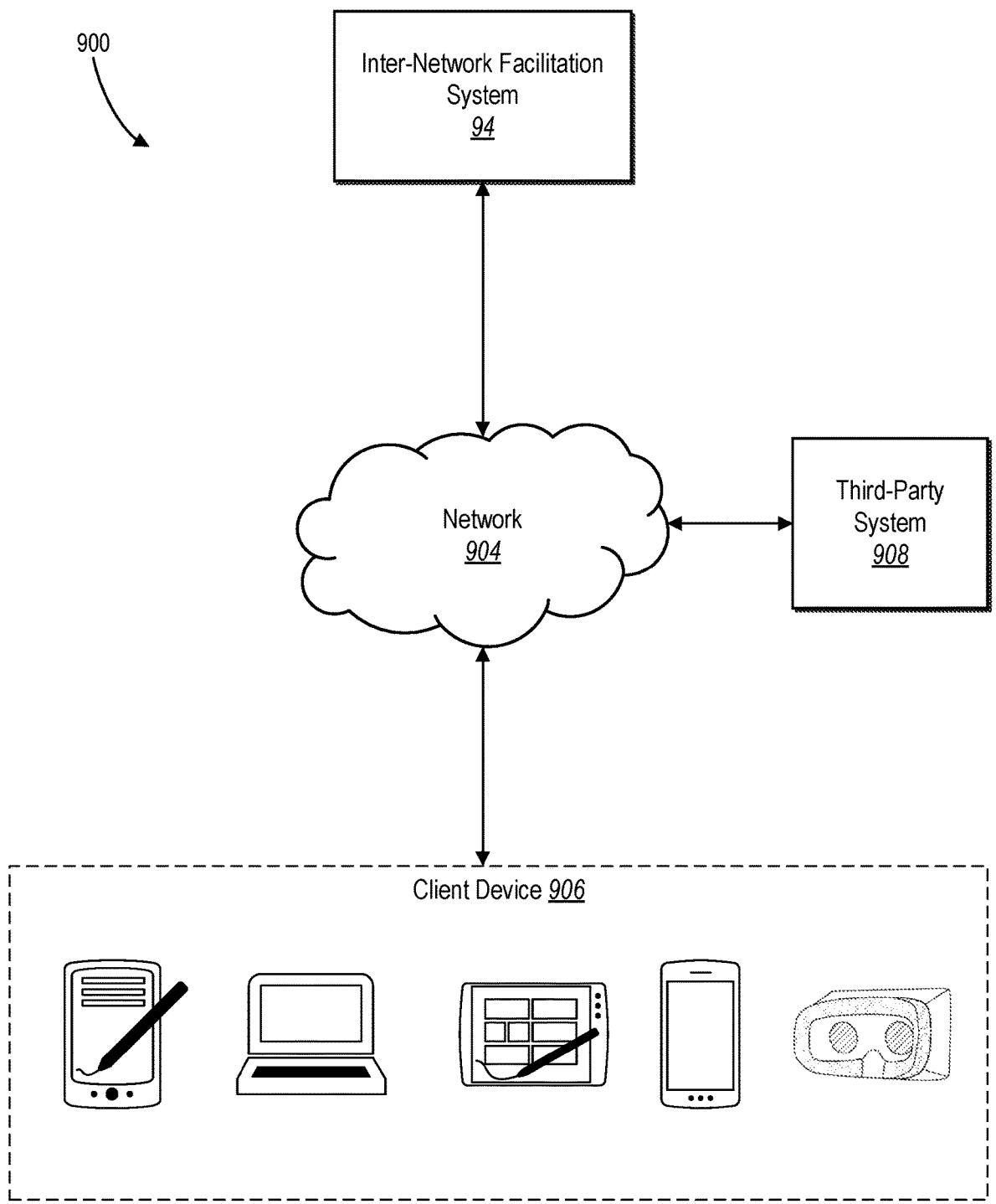
FIG. 9 illustrates an example environment for an automated client interaction system in accordance with one or more embodiments.

FIG. 9 illustrates an example network environment 900 of the inter-network facilitation system 104. The network environment 900 includes a client device 906 (e.g., client device 108), an inter-network facilitation system 104, and a third-party system 908 connected to each other by a network 904. Although FIG. 9 illustrates a particular arrangement of the client device 906, the inter-network facilitation system 104, the third-party system 908, and the network 904, this disclosure contemplates any suitable arrangement of client device 906, the inter-network facilitation system 104, the third-party system 908, and the network 904. As an example, and not by way of limitation, two or more of client device 906, the inter-network facilitation system 104, and the third-party system 908 communicate directly, bypassing network 904. As another example, two or more of client device 906, the inter-network facilitation system 104, and the third-party system 908 may be physically or logically co-located with each other in whole or in part.

Moreover, although FIG. 9 illustrates a particular number of client devices 906, inter-network facilitation systems 104, third-party systems 908, and networks 904, this disclosure contemplates any suitable number of client devices 906, inter-network facilitation system 104, third-party systems 908, and networks 904. As an example, and not by way of limitation, network environment 900 may include multiple client device 906, inter-network facilitation system 104, third-party systems 908, and/or networks 904.

This disclosure contemplates any suitable network 904. As an example, and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906 and third-party system 908 to network 904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by client device 906. As an example, and not by way of limitation, a client device 906 may include any of the computing devices discussed above in relation to FIG. 9. A client device 906 may enable a network user at the client device 906 to access network 904. A client device 906 may enable its user to communicate with other users at other client devices 906.

In particular embodiments, the client device 906 may include a requester application or a web browser, such as MICROSOFT INTERNET EXPLORER, GOOGLE CHROME, or MOZILLA FIREFOX, and may have one or more add-ons, plug-ins, or other extensions, such as TOOL-BAR or YAHOO TOOLBAR. A user at the client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 906 one or more Hyper Text Markup Language ("HTML") files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 904) to link the third-party-system 908. For example, the inter-network facilitation system 104 may receive authentication credentials from a user to link a third-party system 908 such as an online bank account, credit account, debit account, or other financial account to a user account within the inter-network facilitation system 104. The inter-network facilitation system 104 can subsequently communicate with the third-party system 908 to detect or identify balances, transactions, withdrawal, transfers, deposits, credits, debits, or other transaction types associated with the third-party system 908. The inter-network facilitation system 104 can further provide the aforementioned or other financial information associated with the third-party system 908 for display via the client device 906. In some cases, the inter-network facilitation system 104 links more than one third-party system 908, receiving account information for accounts associated with each respective third-party system 908 and performing operations or transactions between the different systems via authorized network connections.

In particular embodiments, the inter-network facilitation system 104 may interface between an online banking system and a credit processing system via the network 904. For example, the inter-network facilitation system 104 can provide access to a bank account of a third-party system 908 and linked to a user account within the inter-network facilitation system 104. Indeed, the inter-network facilitation system 104 can facilitate access to, and transactions to and from, the bank account of the third-party system 908 via a client application of the inter-network facilitation system 104 on the client device 906. The inter-network facilitation system 104 can also communicate with a credit processing system, an ATM system, and/or other financial systems (e.g., via the network 904) to authorize and process credit charges to a credit account, perform ATM transactions, perform transfers (or other transactions) across accounts of different third-party systems 908, and to present corresponding information via the client device 906.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 908), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 900 either directly or via network 904. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1004.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 906. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 906 associated with users.

In addition, the third-party system 908 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 904. A third-party system 908 can communicate with the inter-network facilitation system 104 to provide financial information pertaining to balances, transactions, and other information, whereupon the inter-network facilitation system 104 can provide corresponding information for display via the client device 906. In particular embodiments, a third-party system 908 communicates with the inter-network facilitation system 104 to update account balances, transaction histories, credit usage, and other internal information of the inter-network facilitation system 104 and/or the third-party system 908 based on user interaction with the inter-network facilitation system 104 (e.g., via the client device 906). Indeed, the inter-network facilitation system 104 can synchronize information across one or more third-party systems 908 to reflect accurate account information (e.g., balances, transactions, etc.) across one or more networked systems, including instances where a transaction (e.g., a transfer) from one third-party system 908 affects another third-party system 908.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:
1. A computer-implemented method comprising:
 extracting client features corresponding to a client device participating in an automated interactive digital text thread;

generating, utilizing an agent escalation machine learning model, a plurality of predicted client-agent escalation classes and a plurality of escalation class probabilities from the client features;

selecting a predicted client-agent escalation class from the plurality of predicted client-agent escalation classes utilizing the plurality of escalation class probabilities;

providing, for display via the client device, a personalized escalation digital text reply option corresponding to the predicted client-agent escalation class via the automated interactive digital text thread, wherein the personalized escalation digital text reply option is associated with a client self-service workflow corresponding to the predicted client-agent escalation class; and executing the client self-service workflow based on receiving an indication of a user interaction with the personalized escalation digital text reply option.

2. The computer-implemented method of claim 1, wherein extracting the client features comprises extracting historical device activity of a digital account corresponding to the client device, and further comprising generating, utilizing the agent escalation machine learning model, the plurality of predicted client-agent escalation classes and the plurality of escalation class probabilities from the historical device activity of the digital account corresponding to the client device.

3. The computer-implemented method of claim 1, further comprising generating the plurality of predicted client-agent escalation classes and the plurality of escalation class probabilities utilizing the agent escalation machine learning model trained from a plurality of client-agent escalation class predictions with ground truth client-agent escalation classes.

4. The computer-implemented method of claim 1, further comprising generating the plurality of predicted client-agent escalation classes and the plurality of escalation class probabilities utilizing one or more of a neural network, a random forest model, or a gradient boosted decision tree model.

5. The computer-implemented method of claim 1, wherein providing the personalized escalation digital text reply option corresponding to the predicted client-agent escalation class via the automated interactive digital text thread comprises:

generating an escalation ranking of the plurality of predicted client-agent escalation classes utilizing the plurality of escalation class probabilities; and selecting the personalized escalation digital text reply option according to the escalation ranking.

6. The computer-implemented method of claim 1, further comprising: providing, for display via the client device, an additional personalized intent digital classification option corresponding to an additional predicted client intent classification via the automated interactive digital text thread.

7. The computer-implemented method of claim 1, wherein executing the client self-service workflow based on receiving the indication of the user interaction with the personalized escalation digital text reply option comprises:

executing a query corresponding to the predicted client-agent escalation class to identify a query response; and providing, for display, via the client device, a digital text reply comprising the query response.

8. A non-transitory computer-readable medium storing instructions that, when executed by at least one processor, cause a computer system to:

extract client features corresponding to a client device participating in an automated interactive digital text thread;

generate, utilizing an agent escalation machine learning model, a plurality of predicted client-agent escalation classes and a plurality of escalation class probabilities from the client features;

select a predicted client-agent escalation class from the plurality of predicted client-agent escalation classes utilizing the plurality of escalation class probabilities;

provide, for display via the client device, a personalized escalation digital text reply option corresponding to the predicted client-agent escalation class via the automated interactive digital text thread, wherein the personalized escalation digital text reply option is associated with a client self-service workflow corresponding to the predicted client-agent escalation class; and execute the client self-service workflow based on receiving an indication of a user interaction with the personalized escalation digital text reply option.

9. The non-transitory computer-readable medium of claim 8, further comprising instructions that, when executed by the at least one processor, cause the computer system to:

extract the client features by extracting historical device activity of a digital account corresponding to the client device, and generate, utilizing the agent escalation machine learning model, the plurality of predicted client-agent escalation classes and the plurality of escalation class probabilities from the historical device activity of the digital account corresponding to the client device.

10. The non-transitory computer-readable medium of claim 8, further comprising instructions that, when executed by the at least one processor, cause the computer system to generate the plurality of predicted client-agent escalation classes and the plurality of escalation class probabilities utilizing the agent escalation machine learning model trained from a plurality of client-agent escalation class predictions with ground truth client-agent escalation classes.

11. The non-transitory computer-readable medium of claim 8, further comprising instructions that, when executed by the at least one processor, cause the computer system to generate the plurality of predicted client-agent escalation classes and the plurality of escalation class probabilities utilizing one or more of a neural network, a random forest model, or a gradient boosted decision tree model.

12. The non-transitory computer-readable medium of claim 8, further comprising instructions that, when executed by the at least one processor, cause the computer system to provide the personalized escalation digital text reply option corresponding to the predicted client-agent escalation class via the automated interactive digital text thread by:

generating an escalation ranking of the plurality of predicted client-agent escalation classes utilizing the plurality of escalation class probabilities; and selecting the personalized escalation digital text reply option according to the escalation ranking.

13. The non-transitory computer-readable medium of claim 8, further comprising instructions that, when executed by the at least one processor, cause the computer system to provide, for display via the client device, an additional personalized intent digital classification option corresponding to an additional predicted client intent classification via the automated interactive digital text thread.

14. The non-transitory computer-readable medium of claim 8, further comprising instructions that, when executed by the at least one processor, cause the computer system to execute the client self-service workflow based on receiving the indication of the user interaction with the personalized escalation digital text reply option by:

executing a query corresponding to the predicted client-agent escalation class to identify a query response; and providing, for display, via the client device, a digital text reply comprising the query response.

15. A system comprising:

at least one processor; and at least one non-transitory computer-readable storage medium storing instructions that, when executed by the at least one processor, cause the system to:

extract client features corresponding to a client device participating in an automated interactive digital text thread;

generate, utilizing an agent escalation machine learning model, a plurality of predicted client-agent escalation classes and a plurality of escalation class probabilities from the client features;

select a predicted client-agent escalation class from the plurality of predicted client-agent escalation classes utilizing the plurality of escalation class probabilities;

provide, for display via the client device, a personalized escalation digital text reply option corresponding to the predicted client-agent escalation class via the automated interactive digital text thread, wherein the personalized escalation digital text reply option is associated with a client self-service workflow corresponding to the predicted client-agent escalation class; and execute the client self-service workflow based on receiving an indication of a user interaction with the personalized escalation digital text reply option.

16. The system of claim 15, further comprising instructions that, when executed by the at least one processor, cause the system to:

extract the client features by extracting historical device activity of a digital account corresponding to the client device, and generate, utilizing the agent escalation machine learning model, the plurality of predicted client-agent escalation classes and the plurality of escalation class probabilities from the historical device activity of the digital account corresponding to the client device.

17. The system of claim 15, further comprising instructions that, when executed by the at least one processor, cause the system to generate the plurality of predicted client-agent escalation classes and the plurality of escalation class probabilities utilizing the agent escalation machine learning model trained from a plurality of client-agent escalation class predictions with ground truth client-agent escalation classes.

18. The system of claim 15, further comprising instructions that, when executed by the at least one processor, cause the system to generate the plurality of predicted client-agent escalation classes and the plurality of escalation class probabilities utilizing one or more of a neural network, a random forest model, or a gradient boosted decision tree model.

19. The system of claim 15, further comprising instructions that, when executed by the at least one processor, cause the system to provide the personalized escalation digital text reply option corresponding to the predicted client-agent escalation class via the automated interactive digital text thread by:

generating an escalation ranking of the plurality of predicted client-agent escalation classes utilizing the plurality of escalation class probabilities; and selecting the personalized escalation digital text reply option according to the escalation ranking.

20. The system of claim 15, further comprising instructions that, when executed by the at least one processor, cause the system to provide, for display via the client device, an additional personalized intent digital classification option corresponding to an additional predicted client intent classification via the automated interactive digital text thread.

\* \* \* \* \*